US012591274B2

(12) United States Patent
Lee et al.

(10) Patent No.: US 12,591,274 B2
(45) Date of Patent: Mar. 31, 2026

(54) GLASS SUBSTRATE FOR FLEXIBLE DISPLAY AND DISPLAY DEVICE INCLUDING THE SAME

(71) Applicant: SAMSUNG ELECTRONICS CO., LTD., Suwon-si (KR)

(72) Inventors: Hosoon Lee, Suwon-si (KR); Gyejoon Yoo, Suwon-si (KR); Wonsun Lee, Suwon-si (KR); Jinsoo Choi, Suwon-si (KR); Hyunsuk Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 390 days.

(21) Appl. No.: 18/158,510

(22) Filed: Jan. 24, 2023

(65) Prior Publication Data

US 2023/0168718 A1      Jun. 1, 2023

Related U.S. Application Data

(63) Continuation of application No. PCT/KR2022/016057, filed on Oct. 20, 2022.

(30) Foreign Application Priority Data

Dec. 1, 2021      (KR) ........................ 10-2021-0170320

(51) Int. Cl.
    *B32B 15/04*          (2006.01)
    *B32B 17/06*          (2006.01)
    (Continued)
(52) U.S. Cl.
    CPC .......... *G06F 1/1652* (2013.01); *C03C 21/002* (2013.01); *G06F 1/1681* (2013.01)
(58) Field of Classification Search
    CPC ................................................. C03C 21/002
    (Continued)

(56) References Cited

U.S. PATENT DOCUMENTS 10,206,298 B2 *   2/2019   Memering ............ C03C 21/002
11,565,969 B2 *   1/2023   Luzzato ................ C03C 21/002
                  (Continued)

FOREIGN PATENT DOCUMENTS

KR      1020210047753 A      4/2021
KR      1020210052759 A      5/2021
                  (Continued)

OTHER PUBLICATIONS

European Search Report for European Patent Application No. 22901572.2 dated Jan. 8, 2025.
                  (Continued)

*Primary Examiner* — Lauren R Colgan
(74) *Attorney, Agent, or Firm* — CANTOR COLBURN LLP

(57)          ABSTRACT

A glass substrate includes a first portion corresponding to a flat portion of a flexible display, a second portion adjacent to the first portion and corresponding to a bendable portion of the flexible display, a third portion connecting the first and second portions to each other, a depth of layer, an average thickness at each of the first portion, the second portion and the third portion. and an average depth of the depth of layer, at each of the first portion, the second portion and the third portion. The average thickness of the glass substrate at the first portion is greater than the average thickness of the glass substrate at the second portion, and the average depth of the depth of layer at the first portion is about 0.75 to about 1.3 times the average depth of the depth of layer at the second portion.

13 Claims, 8 Drawing Sheets

(51) Int. Cl.
    *C03C 21/00*         (2006.01)
    *G06F 1/16*         (2006.01)

(58) Field of Classification Search
    USPC ................................................. 428/410, 426
    See application file for complete search history.

(56)               References Cited

U.S. PATENT DOCUMENTS

| | | | |
|---|---|---|---|
| 11,581,510 B2* | 2/2023 | Min | C03C 21/002 |
| 11,905,205 B2* | 2/2024 | Davis | G06F 1/1601 |
| 2012/0236526 A1* | 9/2012 | Weber | C03C 21/002 |
| | | | 65/30.14 |
| 2014/0162029 A1 | 6/2014 | Takeuchi et al. | |
| 2015/0274585 A1* | 10/2015 | Rogers | C03C 21/002 |
| | | | 65/30.14 |
| 2019/0023611 A1* | 1/2019 | Luzzato | C03C 21/002 |
| 2019/0161401 A1* | 5/2019 | Kuang | C03C 15/00 |
| 2019/0276356 A1* | 9/2019 | Abbott | C03C 19/00 |
| 2019/0330103 A1* | 10/2019 | Ozeki | C03C 3/091 |
| 2020/0392038 A1* | 12/2020 | Park | H04M 1/0268 |
| 2021/0107826 A1* | 4/2021 | Hwang | C03C 17/3405 |
| 2021/0135158 A1 | 5/2021 | Min | |
| 2023/0135503 A1* | 5/2023 | Choi | C03B 23/0235 |
| | | | 428/174 |
| 2023/0250013 A1* | 8/2023 | Noda | C03C 3/091 |
| | | | 65/31 |
| 2023/0312393 A1* | 10/2023 | Kawamoto | C03C 3/091 |
| | | | 501/68 |

FOREIGN PATENT DOCUMENTS

| | | | | |
|---|---|---|---|---|
| KR | 102272926 B1 | | 7/2021 |
| KR | 20210103405 A | | 8/2021 |
| KR | 20230063196 A | | 5/2023 |
| WO | WO2022024767 | * | 7/2021 |

OTHER PUBLICATIONS

PCT International Search Report for PCT/KR2022/016057 dated Jan. 27, 2023.
Korean Office Action for Korean Patent Application No. 10-2021-0170320 dated Aug. 7, 2025.

* cited by examiner

GLASS SUBSTRATE FOR FLEXIBLE DISPLAY AND DISPLAY DEVICE INCLUDING THE SAME

CROSS-REFERENCE TO RELATED APPLICATIONS

This application is a continuation application of International Application No. PCT/KR2022/016057 designating the United States, filed on Oct. 20, 2022, in the Korean Intellectual Property Receiving Office and claiming priority to Korean Patent Application No. 10-2021-0170320, filed on Dec. 1, 2021, in the Korean Intellectual Property Office, the disclosures of which are incorporated by reference herein in their entireties.

BACKGROUND

1. Field

The disclosure relates to a glass substrate for a flexible display and a display device which includes the glass substrate.

2. Description of Related Art

An electronic device may include a device that performs a specific function according to a loaded electronic program, such as a home appliance, an electronic notebook, a portable multimedia player, a mobile communication terminal, a tablet personal computer (PC), a video/audio device, a desktop/laptop computer, or a vehicle navigation system. For example, such electronic devices may output stored information as sound or images.

As electronic devices have become highly integrated, and high-speed and high-volume wireless communication has come into wider use, various functions have been mounted in a single electronic device such as a mobile communication terminal. For example, an entertainment function, such as gaming, a multimedia function, such as music/video play, a communication and security function for mobile banking, a scheduling function, or an electronic wallet function as well as a communication function have been integrated into a single electronic device.

With a significant decrease in a functional gap of each manufacturer, electronic devices have become slimmer to meet consumers' purchasing needs. In order to increase the rigidity of electronic devices, strengthen the design aspect thereof, and differentiate functional elements thereof, electronic devices have been improved. Such electronic devices are being transformed from a uniform rectangular shape into a variety of shapes. For example, electronic devices may be conveniently carried and have a transformable structure that may use a large screen display when being used. As a part of such electronic devices, foldable or rollable electronic devices have been continuously released, and a support structure for a foldable, rollable or bendable display may also be improved.

SUMMARY

A glass substrate available for an electronic device may increase a strength against an external impact by generating a stress in the glass substrate through chemical strengthening. A glass substrate for a flexible display may be a glass substrate including two or more portions having different thicknesses, instead of having a single thickness. If the same degree of chemical strengthening is performed on portions having different thicknesses, amounts of expansion of the portions may be different from each other.

Specifically, if a single depth of layer is formed regardless of a thickness for each position of a glass substrate having a varying thickness, an amount of expansion of a relatively thick portion and an amount of expansion of a single portion may be different, and a decrease in a surface quality such as warpage and bending deformation of a glass substrate may occur.

Embodiments may provide a glass substrate for a flexible display including two or more portions with different thicknesses. After chemical strengthening is performed on a surface of the glass substrate, a compression strength may be reduced through an etching process, and amounts of expansion of all portions of the glass substrate may be controlled at the same or substantially the same level.

According to an embodiment, a glass substrate for a flexible display includes a first portion, a second portion, and a third portion connecting the first portion and the second portion. An average thickness of the first portion may be greater than an average thickness of the second portion, and an average of a depth of layer of the first portion may be about 0.75 times to about 1.3 times an average of a depth of layer of the second portion.

According to an embodiment, a display device for a flexible display may include a display module including a folding area and a non-folding area adjacent to the folding area, and a glass substrate arranged on the display module.

According to an embodiment, an electronic device including a flexible display may include a housing, a folding hinge portion, a display module, and the flexible display arranged on the display module.

According to embodiments, a glass substrate for a flexible display may have the same or substantially the same expansion rate regardless of a thickness for each portion and/or each position of the glass substrate and may have improved warpage or bending deformation.

According to embodiments, a glass substrate may have a compression strength of a surface reduced by performing an etching process and may be balanced by suppressing bending deformation and/or warpage.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure will be described with reference to the accompanying drawings.

Figure 1:
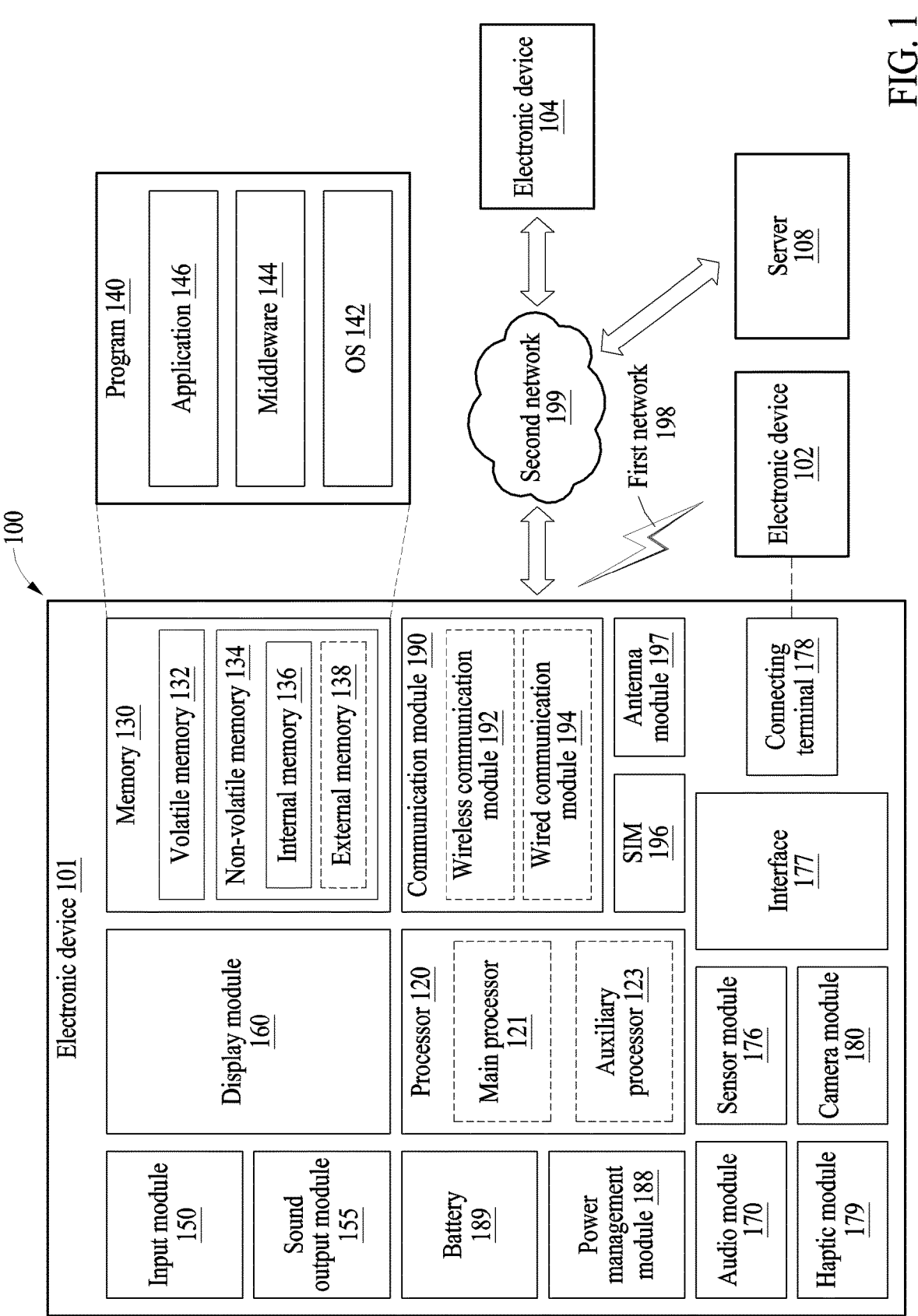
FIG. 1 is a block diagram illustrating an electronic device in a network environment according to an embodiment.

FIG. 1 is a block diagram illustrating an electronic device 101 in a network environment 100 according to one embodiment.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal and vice versa. According to one embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to one embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
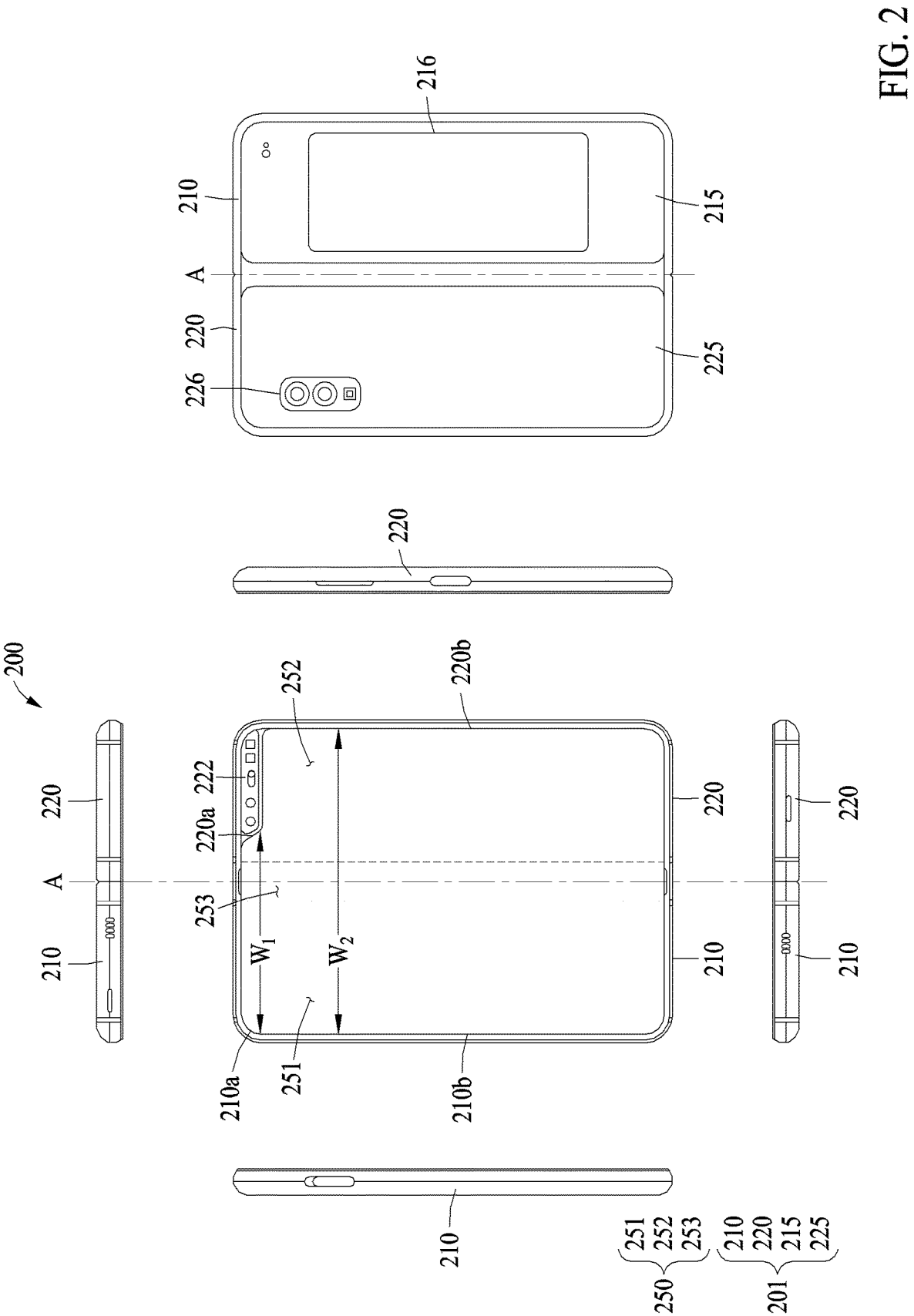
FIG. 2 is a view of an electronic device in an unfolded state according to an embodiment.
Figure 3:
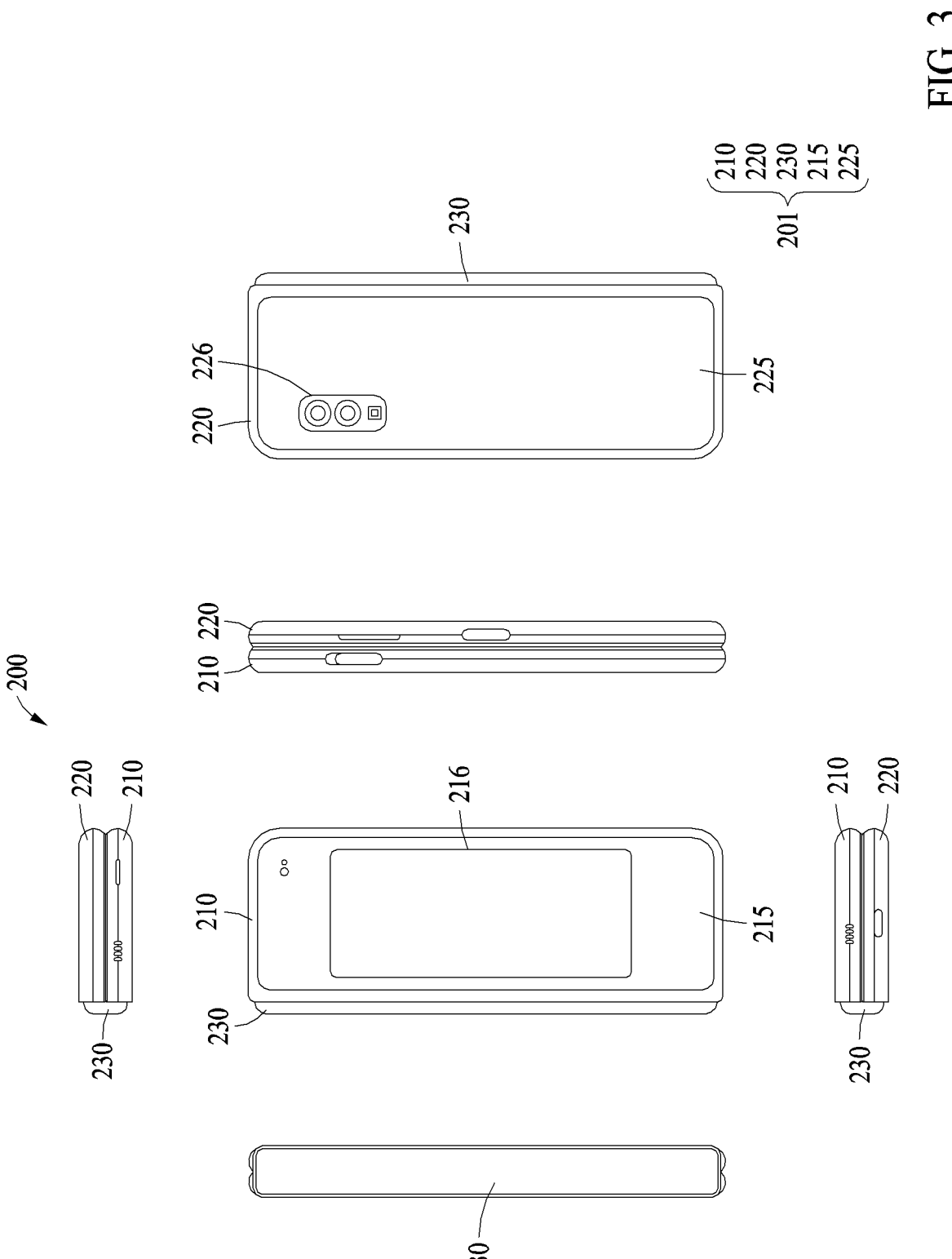
FIG. 3 is a view of an electronic device in a folded state according to an embodiment.
Figure 4A:
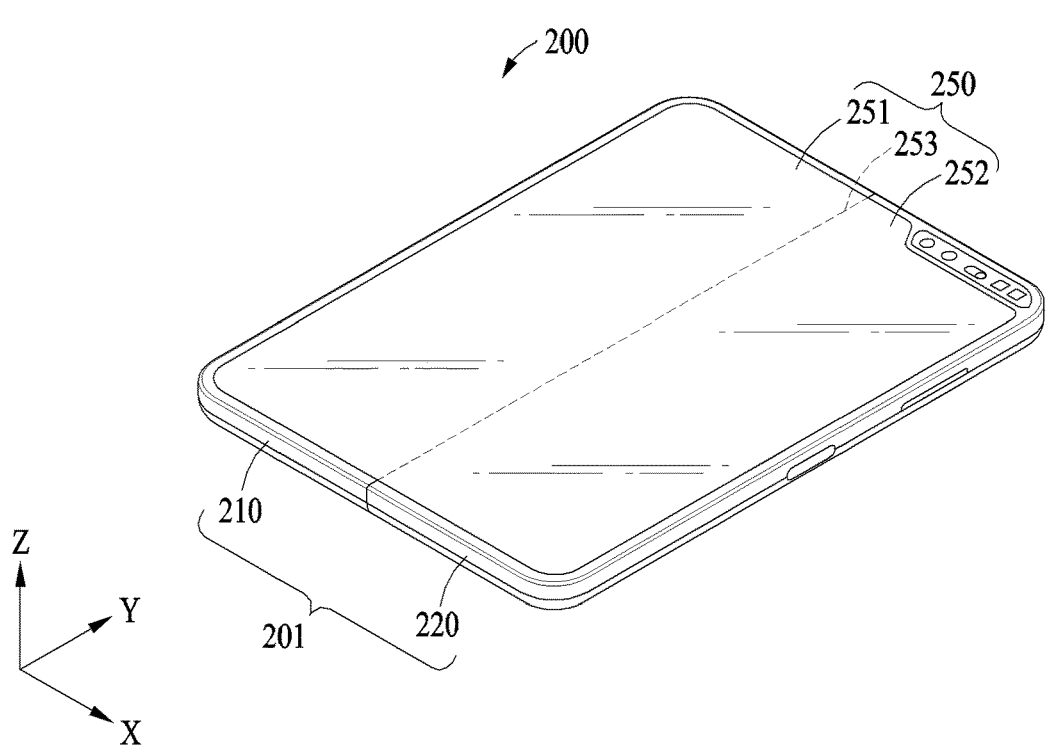
FIGS. 4A and 4B are perspective views of an electronic device in a fully unfolded state or a partially unfolded state (or an intermediate state) according to an embodiment.
Figure 4B:
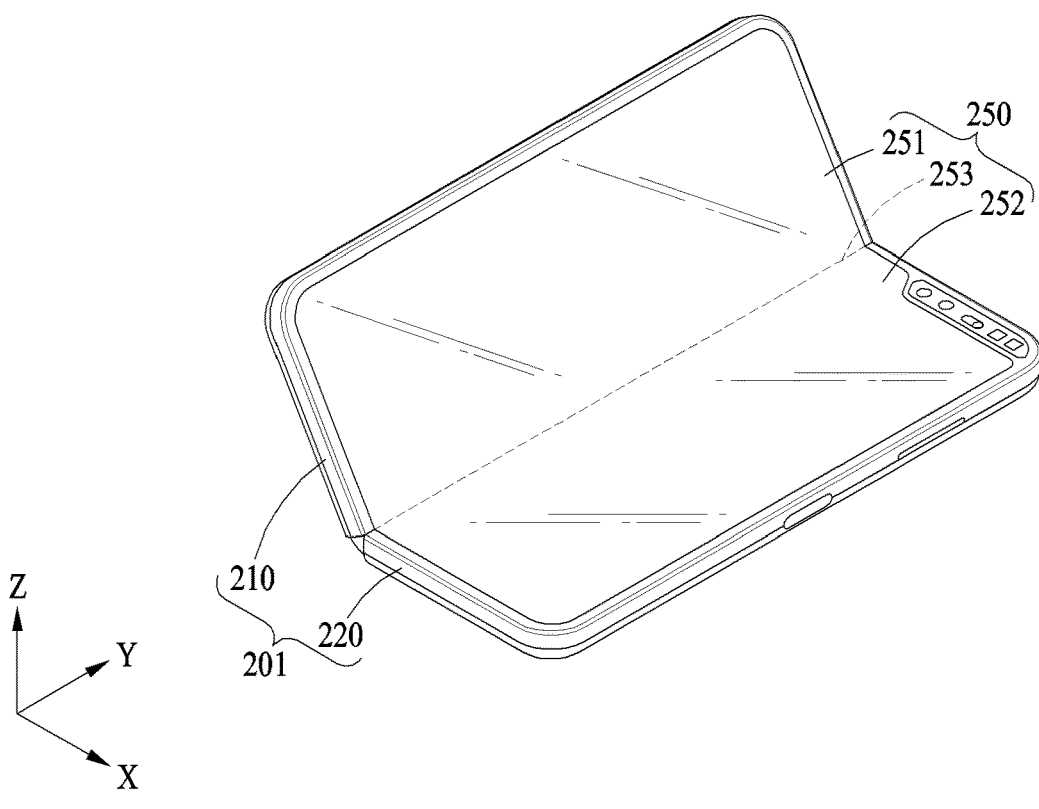

FIG. 2 is a view of an electronic device 200 which is unfolded (e.g., in an unfolded state) according to an embodiment. FIG. 3 is a view of the electronic device 200 which is folded (e.g., in a folded state) according to an embodiment. Within each of FIGS. 2 and 3, the middle views in order from left to right show a left side view, a front view, a right side view and a rear view, the uppermost view shows top side view, and the lowermost view shows a bottom side view, relative to each other. FIGS. 4A and 4B are perspective views illustrating an example of the electronic device 200 which is fully unfolded and partially unfolded (e.g., in a fully unfolded state and a partially unfolded state (or an intermediate state)) according to an embodiment.

The electronic device 200 of FIGS. 2 through 4B is an example of the electronic device 101 of FIG. 1, and may be a foldable or bendable electronic device. Various components or layers of the electronic device may be foldable or bendable together with each other.

FIGS. 4A and 4B illustrate a spatial coordinate system defined by an X-axis, a Y-axis, and a Z-axis that are orthogonal to each other. Here, the X-axis may represent a width direction of an electronic device, the Y-axis may represent a length direction of the electronic device, and the Z-axis may represent a height (or thickness) direction of the electronic device. In the following description, a "first direction" may refer to a direction parallel to the Z-axis. Referring to FIG. 4A, for example, the electronic device 200 which is flat may be disposed in a plane defined by a second direction and a third direction crossing each other (e.g., variously the X-axis and the Y-axis directions).

Referring to FIGS. 2 and 3, in an embodiment, the electronic device 200 may include a foldable housing 201, and a flexible or foldable display 250 (hereinafter simply referred to as the "display" 250) (e.g., the display module 160 of FIG. 1) disposed in a space formed by the foldable housing 201. A surface on which the display 250 is disposed (or a surface on which the display 250 is viewed from the outside of the electronic device 200) may be defined as a front surface of the electronic device 200. In addition, a surface opposite to the front surface may be defined as a rear surface of the electronic device 200. Further, a surface surrounding a space between the front surface and the rear surface may be defined as a side surface of the electronic device 200.

According to an embodiment, the foldable housing 201 may include a first housing structure 210, a second housing structure 220 including a sensor area 222, a first rear cover 215, a second rear cover 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2 and 3, and may be implemented in a different shape or a different combination of components. For example, in an embodiment, the first housing structure 210 and the first rear cover 215 may be integrally formed as a first housing, and the second housing structure 220 and the second rear cover 225 may be integrally formed as a second housing. The first housing and the second housing may together form a housing of the electronic device 200.

According to an embodiment, the first housing structure 210 may be connected to the hinge structure 230, and may include a first surface facing a first direction, and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate (e.g., be rotatable) with respect to the first housing structure 210 about the hinge structure 230. A state of the electronic device 200 may be changed to a folded state or an unfolded state.

According to an embodiment, the first surface may face the third surface in a state in which the electronic device 200 is fully folded, and the third direction may be identical to the first direction in a state in which the electronic device 200 is fully unfolded.

According to an embodiment, the first housing structure 210 and the second housing structure 220 may be disposed on both sides (e.g., opposing sides) of a folding axis A and generally may be symmetrical with respect to the folding axis A. As to be described hereinafter, an angle or distance between the first housing structure 210 and the second housing structure 220 may vary depending on whether the electronic device 200 is in the unfolded state, the folded state, or an intermediate state (e.g., a partially folded state or a partially unfolded state). According to an embodiment, unlike the first housing structure 210, the second housing structure 220 may additionally include the sensor area 222, in which various sensors are arranged. However, the first housing structure 210 and the second housing structure 220 may have mutually symmetrical shapes in areas other than the sensor area 222. In an embodiment, the sensor area 222 may be additionally disposed in or replaced with at least a partial area of the second housing structure 220. The sensor area 222 may include, for example, a camera hole area, a sensor hole area, an under-display camera (UDC) area, and/or an under-display sensor (UDS) area.

According to embodiments, as shown in FIG. 2, the first housing structure 210 and the second housing structure 220 may together form a recess or receiving space for accommodating the display 250. In an embodiment, due to the sensor area 222, the recess may have at least two different widths in a direction perpendicular to the folding axis A. For example, the recess may have a first width $W_1$ between a first portion 210a of the first housing structure 210 parallel to the folding axis A and a first portion 220a of the second housing structure 220 formed on a periphery of the sensor area 222, and a second width $W_2$ formed by a second portion 210b of the first housing structure 210 and a second portion 220b of the second housing structure 220 not corresponding to the sensor area 222 and being parallel to the folding axis A. In this example, the second width $W_2$ may be greater than the first width $W_1$. In an embodiment, the first portion 220a and the second portion 220b of the second housing structure 220 may be at different distances from the folding axis A. The widths of the recess are not limited to the shown example. In an embodiment, the recess may have a plurality of widths due to the shape of the sensor area 222 or asymmetrical portions of the first housing structure 210 and the second housing structure 220.

According to an embodiment, the sensor area 222 may be formed to have a predetermined area adjacent to one corner of the second housing structure 220. However, the arrangement, shape, and size of the sensor area 222 are not limited to the shown example. For example, in an embodiment, the sensor area 222 may be provided at another corner of the second housing structure 220 or in a predetermined area between an upper corner and a lower corner. In an embodiment, components embedded in the electronic device 200 to perform various functions (e.g., a functional component) may be exposed to the front surface of the electronic device 200 through the sensor area 222 or through one or more openings provided in the sensor area 222. In an embodiment, the components may include various types of sensors. The sensors may include, for example, at least one of a front camera, a receiver, or a proximity sensor. According to an embodiment, the sensor area 222 may not be included in the second housing structure 220 or may be formed at a position different from that shown in the drawings.

According to an embodiment, at least a portion of the first housing structure 210 and the second housing structure 220 may be formed of a metal material or a non-metal material having a selected magnitude of rigidity to support the display 250. At least a portion of the first housing structure 210 and the second housing structure 220 formed of the metal material may provide a ground plane for the electronic device 200, and may be electrically connected to a ground line formed on a PCB disposed in the foldable housing 201.

According to an embodiment, the first rear cover 215 may be disposed on one side of the folding axis A on the rear surface of the electronic device 200, and may have, for example, a substantially rectangular periphery that may be enclosed by the first housing structure 210. Similarly, the second rear cover 225 may be disposed on another side of the folding axis A on the rear surface of the electronic device 200, and may have a periphery that may be enclosed by the second housing structure 220.

According to an embodiment, the first rear cover 215 and the second rear cover 225 may be substantially symmetrical with respect to the folding axis A. However, the first rear cover 215 and the second rear cover 225 are not necessarily mutually symmetrical. For example, the first rear cover 215 and the second rear cover 225 in the electronic device 200 may have various shapes. In an embodiment, the first rear cover 215 may be formed integrally with the first housing structure 210, and the second rear cover 225 may be formed integrally with the second housing structure 220.

According to an embodiment, the first rear cover 215, the second rear cover 225, the first housing structure 210, and the second housing structure 220 may together form a housing which defines a space in which various components (e.g., a PCB, an antenna module, a sensor module, or a battery) of the electronic device 200 are to be arranged. In an embodiment, one or more components may be arranged or visually exposed on (or at) the rear surface of the electronic device 200, to outside the electronic device 200. For example, at least a portion of a sub-display may be visually exposed through a first rear area 216 of the first rear cover 215. In an embodiment, one or more components or sensors may be visually exposed through a second rear area 226 of the second rear cover 225. In an embodiment, the sensors may include a proximity sensor and/or a rear camera module.

According to an embodiment, a front camera exposed to outside the electronic device 200 at the front surface of the electronic device 200 through one or more openings provided in the sensor area 222, or a rear camera exposed to outside the electronic device 200 through the second rear area 226 of the second rear cover 225 may include one or more lenses, an image sensor, and/or an ISP. A flash may include, for example, a light emitting diode (LED) or a xenon lamp. In some embodiments, two or more lenses (e.g., infrared camera, wide-angle, and telephoto lenses) and image sensors may be arranged on one surface of the electronic device 200.

Referring to FIG. 3, the hinge cover may be arranged between the first housing structure 210 and the second housing structure 220 to cover internal components (e.g., the hinge structure 230). According to an embodiment, the hinge structure 230 may be covered by a portion of the first housing structure 210 and a portion of the second housing structure 220, or may be exposed to the outside, depending on the state (e.g., the unfolded state, the intermediate state, or the folded state) of the electronic device 200.

For example, when the electronic device 200 is in the unfolded state (e.g., a fully unfolded state) as illustrated in FIG. 2, the hinge structure 230 may be covered by portions of the first housing structure 210 and the second housing structure 220 such that the hinge structure 230 may not to be exposed (e.g., to outside the display device 200). In another example, when the electronic device 200 is in the folded state (e.g., the fully folded state) as illustrated in FIG. 3, the hinge structure 230 may be exposed to the outside, at a location being between the first housing structure 210 and the second housing structure 220. In another example, when the first housing structure 210 and the second housing structure 220 are in the intermediate state where the first housing structure 210 and the second housing structure 220 are folded with a certain angle, a portion of the hinge structure 230 may be exposed to the outside between the first housing structure 210 and the second housing structure 220. In this example, an exposed area may be less than an area exposed in the fully folded state. In an embodiment, the hinge cover 230 may have a curved surface.

According to an embodiment, the display 250 may be disposed in a space formed by the foldable housing 201. For example, the display 250 may be seated on the recess formed by the foldable housing 201 and may be viewable from the outside through the front surface of the electronic device 200. For example, the display 250 may constitute or define most of the front surface of the electronic device 200. Accordingly, the front surface of the electronic device 200 may include a portion or surface of the display 250, together with a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to an embodiment, the display 250 may refer to a display (or display device) having at least a partial area that is deformable into a flat surface or a curved surface. In an embodiment, the display 250 may include a folding area 253, a first area 251 disposed on one side of the folding area 253 (e.g., on the left side of the folding area 253 shown in FIG. 2), and a second area 252 disposed on the other side of the folding area 253 (e.g., on the right side of the folding area 253 shown in FIG. 2).

However, such an area division of the display 250 shown in FIG. 2 is merely an example, and the display 250 may be divided into a plurality of areas (e.g., four or more areas, or two areas) depending on a structure or functions thereof. In an example, as shown in FIG. 2, the display 250 may be divided into areas based on the folding area 253 extending in parallel to the folding axis A. In another example, the display 250 may be divided into areas based on another folding axis (e.g., a folding axis parallel to a width direction of an electronic device).

According to an embodiment, the display 250 may be coupled to or disposed adjacent to a touch panel (not shown) including a touch sensing circuit and a pressure sensor for measuring a strength (a pressure) of a touch. For example, the display 250 may be coupled to or disposed adjacent to a touch panel for detecting a stylus pen of an electromagnetic resonance (EMR) type, as an example of the touch panel.

According to an embodiment, the first area 251 and the second area 252 may have globally symmetrical shapes around the folding area 253. However, unlike the first area 251, the second area 252 may include a notch that is cut depending on a presence of the sensor area 222, but may have a shape symmetrical to the first area 251 in the other areas. In other words, the first area 251 and the second area 252 may include mutually symmetrical portions and mutually asymmetrical portions.

According to an embodiment, an edge thickness of each of the first area 251 and the second area 252 may be different from an edge thickness of the folding area 253. The edge thickness of the various areas may be taken at an outer edge thereof, without being limited thereto. The edge thickness of the folding area 253 may be less than those of the first area 251 and the second area 252. For example, the first area 251 and the second area 252 may be asymmetrical in terms of the thickness when viewed in a cross section thereof. For example, an edge of the first area 251 may be formed to have a first radius of curvature, and an edge of the second area 252 may be formed to have a second radius of curvature different from the first radius of curvature. In another example, the first area 251 and the second area 252 may be symmetrical in terms of the thickness when viewed in the cross section thereof.

Hereinafter, each area of the display 250, and operations of the first housing structure 210 and the second housing structure 220 depending on the state (e.g., the folded state, the unfolded state, or the intermediate state) of the electronic device 200 will be described.

According to embodiments, when the electronic device 200 is in the unfolded state (e.g., FIG. 2), the first housing structure 210 and the second housing structure 220 may be arranged to face the same direction and define an angle of about 180 degrees between the first housing structure 210 and the second housing structure 220. The surface of the first area 251 of the display 250 and the surface of the second area 252 thereof may face the same direction (e.g., a front direction of an electronic device) with an angle of about 180 degrees therebetween. The folding area 253 may form a same plane together with the first area 251 and the second area 252 (e.g., the folding area 253, the first area 251 and the second area 252 may be coplanar with each other). In another embodiment, when the electronic device 200 is in the unfolded state (e.g., a flat state), the first housing structure 210 and the second housing structure 220 may be folded to oppose each other after being rotated by a predetermined angle (e.g., 360 degrees) with respect to each other such that the first rear cover 215 and the second rear cover 225 may face each other. In other words, the first area 251 and the second area 252 of the display 250 may be arranged to face in opposite directions with respect to each other.

According to embodiments, when the electronic device 200 is in the folded state (e.g., FIG. 3), the first housing structure 210 and the second housing structure 220 may be arranged to face each other. The surface of the first area 251 and the surface of the second area 252 of the display 250 may form a narrow angle (e.g., between about 0 degrees to about 10 degrees) as an internal angle therebetween and may face each other. For example, at least a portion of the folding area 253 may be curved to define a curved surface having a predetermined curvature.

According to an embodiment, when the electronic device 200 is in the intermediate state, the first housing structure 210 and the second housing structure 220 may be arranged to form a predetermined angle (e.g., about 90 degrees) therebetween. The surface of the first area 251 and the surface of the second area 252 of the display 250 may form an angle greater than that in the folded state and smaller than that in the unfolded state. At least a portion of the folding area 253 may include a curved surface having a predetermined curvature, and the curvature may be less than that in the folded state.

FIG. 4A illustrates a fully unfolded state of the electronic device 200, and FIG. 4B illustrates an intermediate state in which the electronic device 200 is partially unfolded. As described above, the state of the electronic device 200 may be changed to the folded state or the unfolded state. According to an embodiment, when viewed in a direction of a folding axis (e.g., the folding axis A of FIG. 2), the electronic device 200 may be folded in two types, e.g., an "in-folding" type in which the front surface of the electronic device 200 is folded to form an acute angle, and an "out-folding" type in which the front surface of the electronic device 200 is folded to form an obtuse angle. In an example, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the z-axis).

In another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2 and another axis parallel to the folding axis A). In this example, the electronic device 200 may also be folded in a "multi-folding" type in which the in-folding type and the out-folding type are combined. Also, although not shown in the drawings, a hinge axis may be formed in a vertical direction or in a horizontal direction when the electronic device 200 is viewed from above. In an example, all the plurality of hinge axes may be arranged in the same direction. In another example, some of the plurality of hinge axes may be arranged in different directions and folded.

The in-folding type may refer to a state in which the display 250 is not exposed to the outside in the fully in-folded state. The out-folding type may refer to a state in which the display 250 is exposed to the outside in the fully out-folded state. FIG. 4B illustrates the intermediate state in which the electronic device 200 is partially unfolded in an in-folding process.

Although the state in which the electronic device 200 is folded in the in-folding type will be described below for convenience's sake, it should be noted that the description may be similarly applied in the state in which the electronic device 200 is folded in the out-folding type.

Figures 5A, 5B:
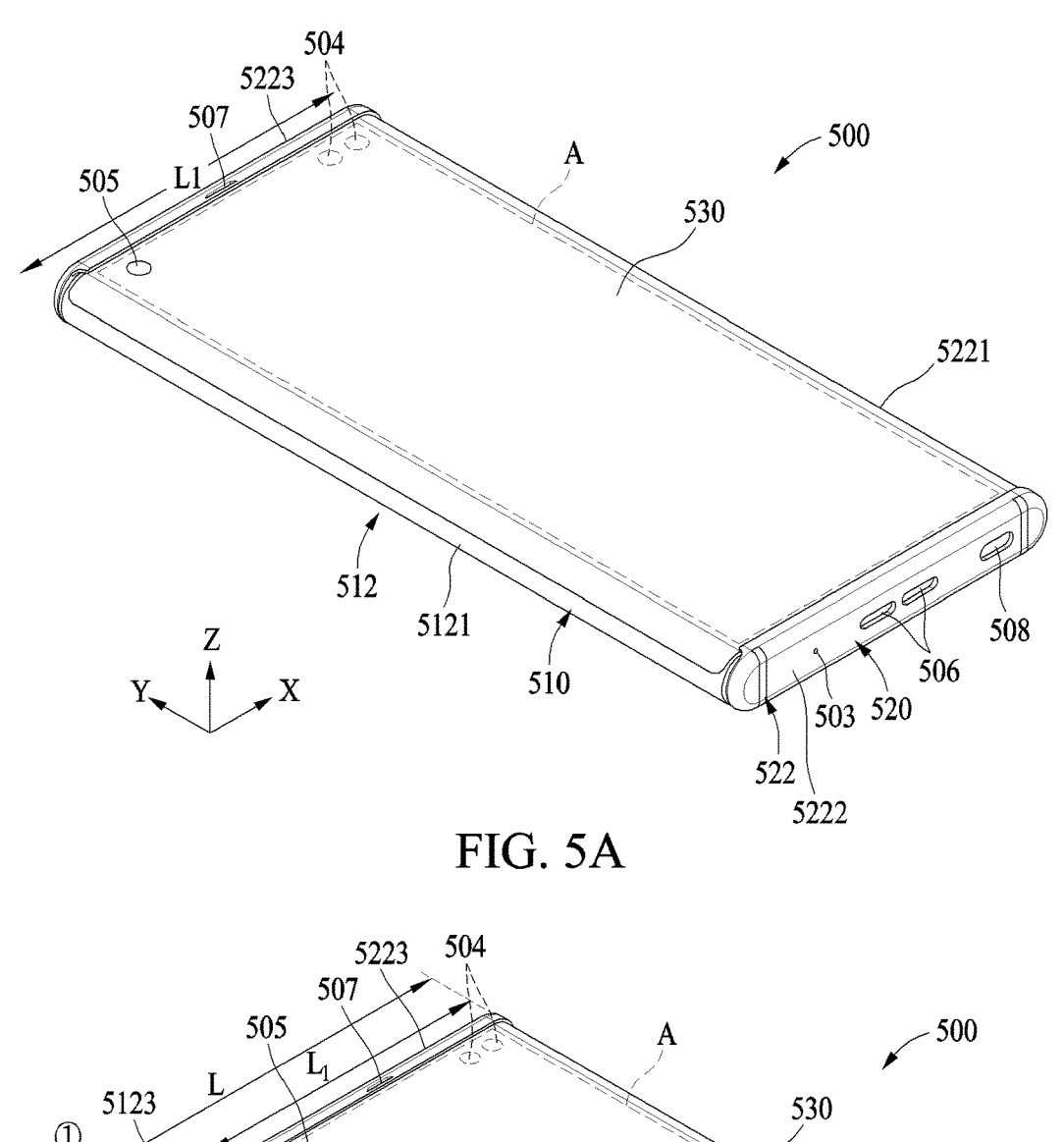
FIGS. 5A and 5B are front perspective views of an electronic device in a closed state and an open state, respectively, according to an embodiment.
Figure 6A:
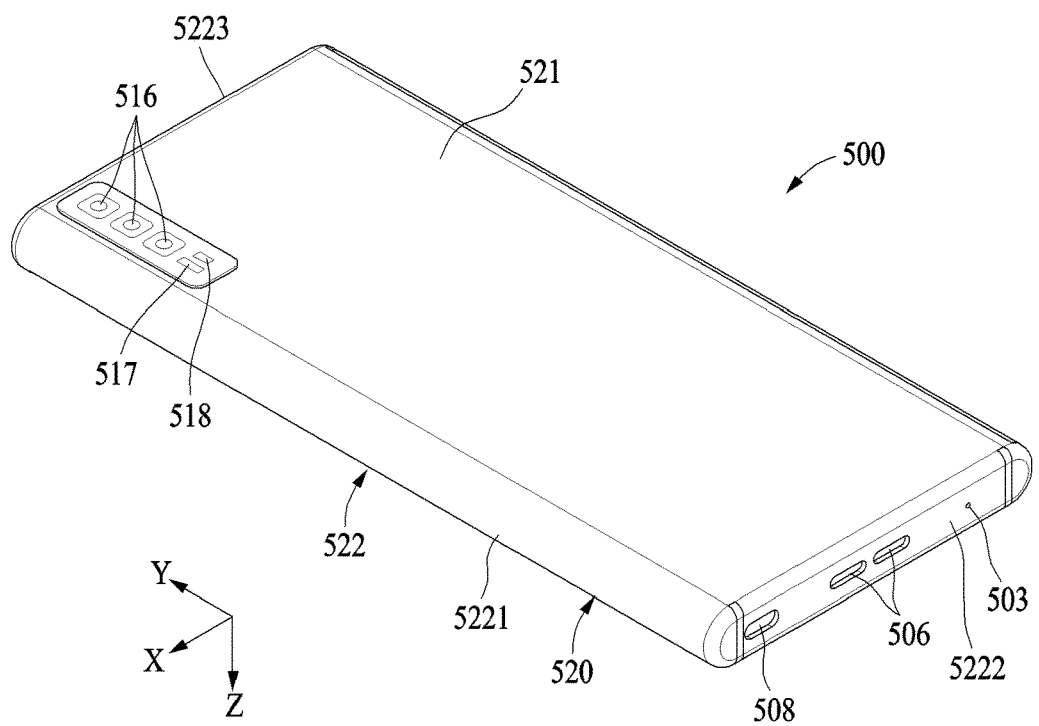
FIGS. 6A and 6B are rear perspective views of an electronic device in a closed state and an open state, respectively, according to an embodiment.
Figure 6B:
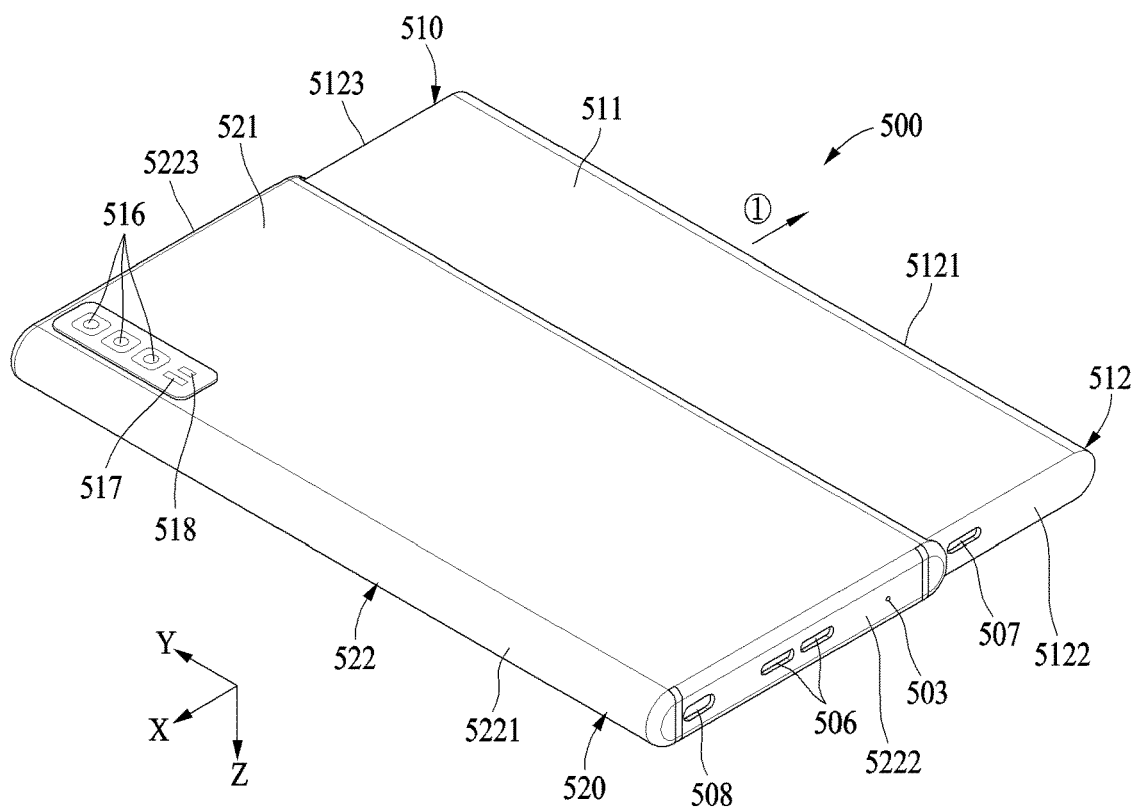

FIGS. 5A and 5B are front perspective views of an electronic device 500 in a closed state and an open state, respectively, according to an embodiment. FIGS. 6A and 6B are rear perspective views of the electronic device 500 in a closed state and an open state according to an embodiment.

The electronic device 500 of FIG. 5A may be at least partially similar to the electronic device 101 of FIG. 1, or may further include other embodiments of the electronic device.

Referring to FIGS. 5A to 6B, the electronic device 500 may include a first housing 510, and a second housing 520 that is at least partially and movably coupled to the first housing 510, such as being slidably disposed therewith. According to an embodiment, the first housing 510 may include a first plate 511, and a first side frame 512 that extends in a substantially vertical direction (e.g., a z-axis direction) along an edge of the first plate 511. According to an embodiment, the first side frame 512 may include a first side surface 5121, a second side surface 5122 extending from one end of the first side surface 5121, and a third side surface 5123 extending from the other end of the first side surface 5121. In an embodiment, the first housing 510 may include a first space that is at least partially closed from the outside, through the first plate 511 and the first side frame 512.

According to an embodiment, the second housing 520 may include a second plate 521, and a second side frame 522 that extends in a substantially vertical direction (e.g., the z-axis direction) along an edge of the second plate 521. According to an embodiment, the second side frame 522 may include a fourth side surface 5221 facing away from the first side surface 5121, a fifth side surface 5222 extending from one end of the fourth side surface 5221 and at least partially coupled to the second side surface 5122, and a sixth side surface 5223 extending from the other end of the fourth side surface 5221 and at least partially coupled to the third side surface 5123. In an example, the fourth side surface 5221 may extend from a structure other than the second plate 521 and may also be coupled to the second plate 521. According to an embodiment, the second housing 520 may include a second space that is at least partially closed from the outside, through the second plate 521 and the second side frame 522, but open to outside the second housing 520 at a side facing the first housing 510. According to an embodiment, the first plate 511 and the second plate 521 may be disposed to at least partially form a rear surface of the electronic device 500. For example, the first plate 511, the second plate 521, the first side frame 512, and the second side frame 522 may be formed of (or include), for example, a polymer, coated or colored glass, ceramic, metal (e.g., aluminum, stainless steel (STS), or magnesium), or a combination of two or more of the above materials.

According to an embodiment, the electronic device 500 may include a flexible display 530 arranged to be supported by the first housing 510 and the second housing 520. According to an embodiment, the flexible display 530 may include a flat portion supported by the second housing 520, and a bendable portion extending from the flat portion and supported by the first housing 510. According to an embodiment, the bendable portion of the flexible display 530 may be disposed in the first space of the first housing 510 not to be exposed to the outside when the electronic device 500 is closed, and may be exposed to the outside to extend from the flat portion while being supported by the first housing 510 when the electronic device 500 is open. Accordingly, the electronic device 500 may be a rollable electronic device in which a display screen of the flexible display 530 is expandable in response to an open operation according to a movement of the first housing 510 from the second housing 520.

According to an embodiment, in the electronic device 500, the first housing 510 may be at least partially inserted into the second space of the second housing 520, and may be coupled to be movable in direction ① (e.g., moving direction). For example, in the closed state, the electronic device 500 may be maintained in a state in which the first housing 510 and the second housing 520 are coupled such that a distance between the first side surface 5121 and the fourth side surface 5221 is a first distance $L_1$. According to an embodiment, in the open state, the electronic device 500 may be maintained in a state in which the first housing 510 protrudes from the second housing 520 to have a second interval distance L in which the first side surface 5121 protrudes from the fourth side surface 5221 by a predetermined distance $L_2$. According to an embodiment, the flexible display 530 may be supported by the first housing 510 and/or the second housing 520 such that both ends thereof have curved edges, in the open state.

According to an embodiment, the electronic device 500 may automatically transition between the open state and the closed state by a driving unit (not shown) disposed in the first space and/or the second space. For example, a processor (e.g., the processor 120 of FIG. 1) of the electronic device 500 may be configured to control an operation of the first housing 510 using the driving unit when an event for a transition between the open state and the closed state of the electronic device 500 is detected. In an example, the first housing 510 may be manually extended out from the second housing 520 through a user's manipulation. In this example, the first housing 510 may extend by an amount desired by a user, and accordingly a screen of the flexible display 530 may vary to have various display areas. Accordingly, the processor (e.g., the processor 120 of FIG. 1) of the electronic device 500 may also perform control such that an object may be displayed in various ways and that an application program may be executed based on a display area corresponding to an amount by which the first housing 510 extends or protrudes.

According to an embodiment, the electronic device 500 may include at least one of an input device 503, sound output devices 506 and 507, sensor modules 504 and 517, camera modules 505 and 516, a connector port 508, a key input device (not shown), or an indicator (not shown). In other embodiments, at least one of the above-described components of the electronic device 500 may be omitted, or the electronic device 500 may further include other components.

According to an embodiment, the input device 503 may include a microphone 503. In some embodiments, the input device 503 may include a plurality of microphones 503 arranged to sense a direction of sound. The sound output devices 506 and 507 may include speakers 506 and 507. The speakers 506 and 507 may include an external speaker 506 and a phone call receiver 507. In an embodiment, when the external speaker 506 is disposed in the first housing 510, sound may be output through a speaker hole 506 formed in the second housing 520 in the closed state. According to an embodiment, the microphone 503 or the connector port 508 may also be formed to have substantially the same configuration. In an embodiment, the sound output devices 506 and 507 may include a speaker (e.g., a piezo speaker) that operates without a separate speaker hole 506.

According to an embodiment, the sensor modules 504 and 517 may generate an electrical signal or a data value corresponding to an internal operational state of the electronic device 500 or an external environmental state. The sensor modules 504 and 517 may include, for example, a first sensor module 504 (e.g., a proximity sensor or an illuminance sensor) disposed on a front surface of the second housing 520, and/or a second sensor module 517 (e.g., a heart rate monitoring (HRM) sensor) disposed on a rear surface of the second housing 520. According to an embodiment, the first sensor module 504 may be disposed below the flexible display 530 in the second housing 520. According to an embodiment, the first sensor module 504 may further include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to one example embodiment, the camera devices 505 and 516 may include a first camera device 505 disposed on the front surface of the second housing 520 of the electronic device 500, and a second camera 516 disposed on the rear surface of the second housing 520. According to an embodiment, the electronic device 500 may include a flash 518 located near the second camera device 516. According to an embodiment, the camera devices 505 and 516 may include one or more lens, an image sensor, and/or an ISP. According to an embodiment, the first camera device 505 may be disposed under the flexible display 530, and may be configured to capture an object through a portion of an active area of the flexible display 530. According to an embodiment, the flash 518 may include, for example, a light-emitting diode (LED) or a xenon lamp. In some embodiments, two or more lenses (e.g., a wide-angle lens and a telephoto lens) and image sensors may be disposed on one surface of the electronic device 500.

According to an embodiment, the electronic device 500 may include at least one antenna (not shown). According to an embodiment, the at least one antenna may wirelessly communicate with an external electronic device (e.g., the electronic device 104 of FIG. 1), or may wirelessly transmit and receive power required for charging. According to an embodiment, the antenna may include a legacy antenna, a mmWave antenna, a near field communication (NFC) antenna, a wireless charging antenna, and/or a magnetic secure transmission (MST) antenna. In an embodiment, an antenna structure may be formed through at least a portion of the first side frame 512 and/or the second side frame 522, which are formed of metal.

Figure 7:
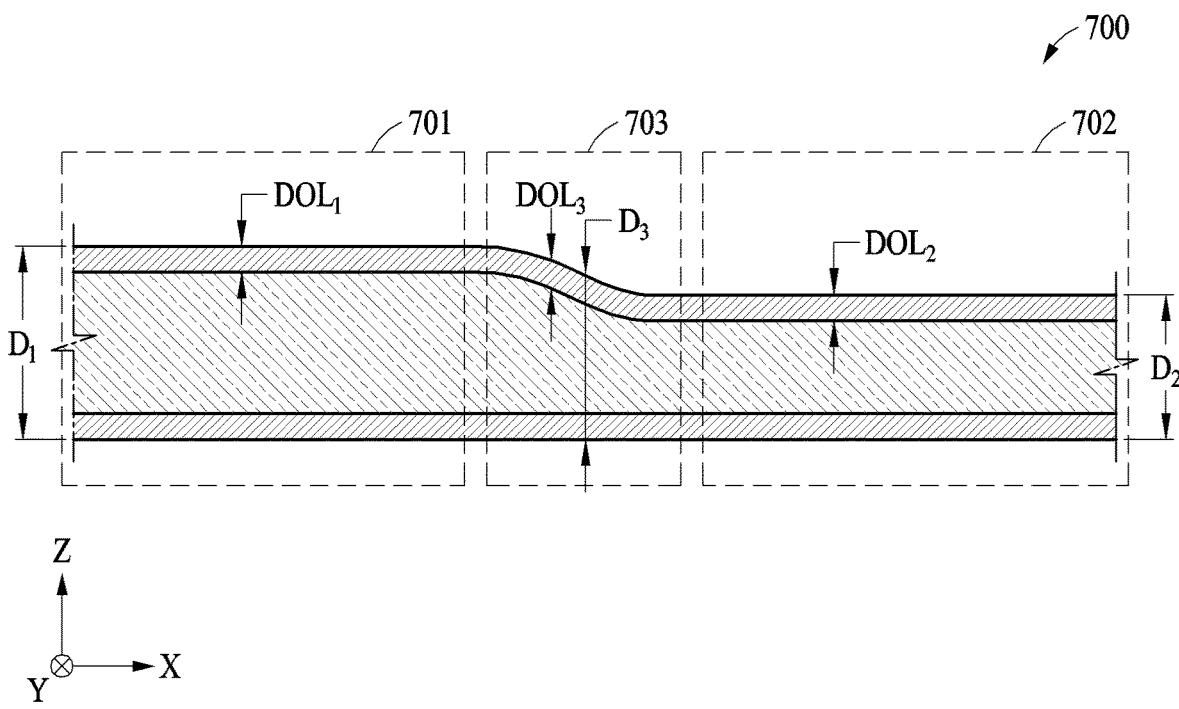
FIG. 7 is an enlarged cross-sectional view of a glass substrate for a flexible display according to an embodiment.

FIG. 7 is a cross-sectional view of a glass substrate 700 for a flexible display according to an embodiment.

Referring to FIG. 7, a glass substrate 700 may include a first portion 701, a second portion 702, and a third portion 703 that is arranged between the first portion 701 and the second portion 702 to connect the first portion 701 and the second portion 702 to each other. According to an embodiment, a thickness $D_1$ (e.g., a first thickness) of the glass substrate 700 at the first portion 701 may be greater than a thickness $D_2$ (e.g., a second thickness) of the glass substrate 700 at the second portion 702. According to an embodiment, a thickness of the glass substrate 700 within each of the first portion 701 and the second portion 702 may be constant or substantially constant. According to an embodiment, an average thickness of the first portion 701 may be greater than an average thickness of the second portion 702.

According to an embodiment, the glass substrate 700 may include the first portion 701, the second portion 702, and the third portion 703 that connects the first portion 701 and the second portion 702 to each other. The average thickness $D_1$ of the first portion 701 may be greater than the average thickness $D_2$ of the second portion 702. The glass substrate 700 may be formed in various shapes. According to an embodiment, the glass substrate 700 may include the first portion 701, the third portion 703, the second portion 702, a fourth portion (not shown), and a fifth portion (not shown) in order, as a first thickness portion, a third thickness portion, a second thickness portion, a fourth thickness portion and a fifth thickness portion, respectively. The fourth portion (not shown) may connect the second portion 702 and the fifth portion (not shown) to each other, and an average thickness of the fifth portion (not shown) may be greater or less than the average thickness $D_2$ of the second portion 702. In an example, the average thickness of the fifth portion (not shown) may be less than the average thickness $D_2$ of the second portion 702, and the glass substrate 700 may include two or more portions with variable thicknesses. In another example, the average thickness of the fifth portion (not shown) may be greater than the average thickness $D_2$ of the second portion 702 and may be equal or substantially equal to the average thickness $D_1$ of the first portion 701, and the glass substrate 700 may include two or more portions with variable thicknesses.

According to an embodiment, the second portion 702 may be formed by performing slimming or computer numerical control (CNC) machining on a full thickness or original thickness portion of the glass substrate 700 to have a thickness less than that of the first portion 701. The slimming may include at least one of wet etching, polishing, laser forming, dry etching and masking. The thickness $D_1$ of the first portion 701 may represent a full thickness or the original thickness, such as a maximum thickness, without being limited thereto.

According to an embodiment, the glass substrate 700 may be strengthened to a predetermined depth from a surface (e.g., an outer surface) of the glass substrate 700, such as through chemical strengthening. According to an embodiment, a depth of layer (DOL) may refer to a depth at which ions on a surface of a substrate are replaced with ions contained in the substrate through chemical strengthening, and a depth from the surface to a point at which replaced ions of a strengthening salt penetrate may be measured. That is, a glass substrate 700 may have an outer thickness portion which defines an outer surface of the glass substrate 700 and has outer ions. An inner thickness portion which is further from the outer surface that the outer thickness portion, also has ions and is spaced apart from the outer surface along the thickness direction (e.g., Z-axis direction). The depth of layer (DOL) may refer to a depth or thickness of the outer thickness portion at which ions are replaced with ions contained in the inner thickness portion, such as through chemical strengthening, and a depth from the surface to a point at which replaced ions of a strengthening salt penetrate may be measured. In an embodiment, a chemically strengthened thickness portion of the glass substrate is extended from an outer surface of the glass substrate, at each of the first portion, the second portion and the third portion, and defines the depth of layer.

According to an embodiment, through the chemical strengthening, a strength of the glass substrate 700 may be enhanced, and a strength against an external impact may be increased by generating compression strength (CS) inside the glass substrate 700 by replacing relatively small ions in the glass substrate 700 with relatively large ions. According to an embodiment, the chemical strengthening may be performed on the glass substrate 700 by immersing the glass substrate 700 in a chemical strengthening solution containing replacement ions. Here, alkali ions contained in the glass substrate 700 may be replaced with alkali ions contained in the chemical strengthening solution. In an example, $Li^+$ ions in the glass substrate 700 may be primarily replaced with $Na^+$ ions in the chemical strengthening solution, and the $Na^+$ ions may be secondarily replaced with $K^+$ ions, so that double chemical strengthening may be performed. In another example, $Na^+$ ions in the glass substrate 700 may be replaced with $K^+$ ions in the chemical strengthening solution, so that stress may be generated inside the glass substrate 700 through single chemical strengthening.

Referring to FIG. 7, the glass substrate 700 may be strengthened to a predetermined depth from the surface (e.g., outer surface) thereof through surface strengthening. Accordingly, strengthening may be performed in a direction from a top surface of the glass substrate 700 as a first outer surface thereof, to a bottom surface of the glass substrate 700 as a second outer surface thereof which is opposite to the first outer surface, on a cross section (e.g., along the thickness direction). According to an embodiment, a depth of layer ($DOL_1$) of the first portion 701 as a first depth of layer, and a depth of layer ($DOL_2$) of the second portion 702 as a second depth of layer, may each be constant or substantially constant. According to an embodiment, an average of the depth of layer ($DOL_1$) of the first portion 701 (e.g., an average depth of the depth of layer) and an average of the depth of layer ($DOL_2$) of the second portion 702 may also be constant or substantially constant. According to an embodiment, the depth of layer ($DOL_1$) of the first portion 701 may be about 0.75 to about 1.3 times the depth of layer ($DOL_2$) of the second portion 702. According to an embodiment, the average of the depth of layer ($DOL_1$) of the first portion 701 may be about 0.75 to about 1.3 times the average of the depth of layer ($DOL_2$) of the second portion 702.

According to an embodiment, the third portion 703 may connect the first portion 701 and the second portion 702, and a thickness $D_3$ (e.g., a third thickness) of the glass substrate 700 at the third portion 703 may gradually change from the first portion 701 to the second portion 702, to connect two portions of the glass substrate 700 that are different in thickness to each other. For example, a thickness of an end of the third portion 703 in a direction of the second portion 702 (e.g., a first end in a +X direction) may be less than a thickness of an end of the third portion 703 in a direction of the first portion 701 (e.g., a second end in a −X direction which is opposite to the first end). According to an embodiment, a depth of layer ($DOL_3$) of the third portion 703 may be constant or substantially constant, regardless of the thickness $D_3$ of the third portion 703. The thicknesses $D_1$, $D_2$ and/or $D_3$ may represent a maximum thickness of the glass substrate 700 at a respective thickness portion thereof. Within such thicknesses, a respective depth of layer may be constant or substantially constant.

According to an embodiment, the third portion 703 may be connected to the first portion 701 in the −X direction and may be connected to the second portion 702 in the +X direction. According to an embodiment, the thickness $D_1$ of the first portion 701 may be greater than the thickness $D_2$ of the second portion 702. The thickness of the end of the third portion 703 which is in the −X direction and closest to the first portion 701, may be equal to the thickness $D_1$ of the first portion 701, and the thickness of the end of the third portion 703 which is in the +X direction and closest to the second portion 702, may be equal to the thickness $D_2$ of the second portion 702. According to an embodiment, the thickness $D_3$ of the third portion 703 may gradually decrease from the end of the third portion 703 in the −X direction to the end of the third portion 703 in the +X direction, in a direction along the glass substrate 700. The thickness $D_3$ may vary based on a position along the third portion 703, and the depth of layer ($DOL_3$) of the third portion 703 may be constant or substantially constant regardless of the thickness $D_3$ and regardless of the position along the third portion 703.

According to an embodiment, the chemical strengthening of the glass substrate 700 may be performed by immersing the glass substrate 700 in a chemical strengthening solution, and a depth of layer may be determined based on a time in which the glass substrate 700 is immersed in the chemical strengthening solution. According to an embodiment, the glass substrate 700 may include a plurality of portions having different thicknesses, for example, the first portion 701 having a relatively large thickness, the second portion 702 having a relatively small thickness, and the third portion 703 having a gradually changing thickness to connect the first portion 701 and the second portion 702 to each other. A depth of layer (DOL) of the glass substrate 700 may be determined based on a time of exposure to the chemical strengthening solution and/or a concentration of a strengthening solution, so that all portions of the glass substrate 700 may have the same depth of layer (DOL).

According to an embodiment, through the chemical strengthening of the surface of the glass substrate 700, relatively small ions near the surface may be exchanged with relatively large ions, and the glass substrate 700 may be expanded. According to an embodiment, the glass substrate 700 may have the same depth of layer as a whole, and an etching process may be additionally performed to reduce compression strength concentrated on the surface, thereby preventing or reducing warpage and/or bending deformation.

According to an embodiment, a chemical strengthening process and an etching process may be sequentially performed on the glass substrate 700, to increase a durability of the glass substrate 700 and reduce the compression strength of the surface of the glass substrate 700. Thus, the glass substrate 700 may have the same or substantially the same rate of expansion regardless of a position, and as a result, an amount of expansion may be the same or substantially the same.

According to an embodiment, the thickness $D_1$ of the first portion 701 may be in a range of about 50 micrometers (μm) to about 500 μm. According to an embodiment, the thickness $D_1$ of the first portion 701 may be constant or substantially constant. According to an embodiment, the average thickness of the first portion 701 may be in a range of about 50 μm to about 500 μm.

According to an embodiment, the thickness $D_1$ of the first portion 701 may be about 50 μm or greater, about 100 μm or greater, about 150 μm or greater, about 200 μm or greater, about 250 μm or greater, about 300 μm or greater, about 350 μm or greater, about 400 μm or greater, or about 450 μm or greater, may be about 500 μm or less, about 450 μm or less, about 400 μm or less, about 350 μm or less, about 300 μm or less, about 250 μm or less, about 200 μm or less or less, about 150 μm or less, or about 100 μm or less, or may be in a range between two values selected from the above-described values. According to an embodiment, the thickness $D_1$ of the first portion 701 may be constant or substantially constant, and accordingly the thickness $D_1$ of the first portion 701 may be equal or similar to the average thickness of the first portion 701.

According to an embodiment, the thickness $D_2$ of the second portion 702 may be in a range of about 10 μm to about 80 μm. According to an embodiment, the thickness of the second portion 702 may be constant or substantially constant. According to an embodiment, the average thickness of the second portion 702 may be in a range of about 10 μm to about 80 μm.

According to an embodiment, the thickness $D_2$ of the second portion 702 may be about 10 μm or greater, about 20 μm or greater, about 30 μm or greater, about 40 μm or greater, about 50 μm or greater, about 60 μm or greater, or about 70 μm or greater, may be about 80 μm or less, about 70 μm or less, about 60 μm or less, about 50 μm or less, about 40 μm or less, about 30 μm or less, or about 20 μm or less, or may be in a range between two values selected from the above-described values. According to an embodiment, the thickness $D_2$ of the second portion 702 may be constant or substantially constant, and accordingly the thickness $D_2$ of the second portion 702 may be equal or similar to the average thickness of the second portion 702.

According to an embodiment, the thickness $D_2$ of the second portion 702 may be less than or equal to about 90% of the thickness $D_1$ of the first portion 701. According to an embodiment, in a display device of an electronic device (e.g., the electronic device 200 of FIG. 2) having a foldable characteristic, or an electronic device (e.g., the electronic device 500 of FIG. 5) having a rollable characteristic, a glass substrate of a foldable area or a rollable area may be thin. That is, the glass substrate may be foldable or rollable, together with the electronic device, the display thereof, etc. According to an embodiment, the thickness $D_2$ of the second portion 702 may be less than or equal to about 90% of the thickness $D_1$ of the first portion 701, such as less than or equal to about 70% of the thickness $D_1$ of the first portion 701, and such as less than or equal to about 50% of the thickness $D_1$ of the first portion 701.

According to an embodiment, a difference between the depth of layer ($DOL_1$) of the first portion 701 and the depth of layer ($DOL_2$) of the second portion 702 may be about 2 μm or less. According to an embodiment, the difference between the depth of layer ($DOL_1$) of the first portion 701 and the depth of layer ($DOL_2$) of the second portion 702 may be about 1.5 μm or less. Here, the depth of layer ($DOL_1$) of the first portion 701 and the depth of layer ($DOL_2$) of the second portion 702 may refer to the average of the depth of layer ($DOL_1$) of the first portion 701 and the average of the depth of layer ($DOL_2$) of the second portion 702, respectively.

According to an embodiment, the depth of layer ($DOL_1$) of the first portion 701 may be in a range of about 7% to about 18% of the thickness $D_1$ of the first portion 701. For example, when the thickness $D_1$ of the first portion 701 is about 200 μm, the depth of layer ($DOL_1$) of the first portion 701 may be in a range of about 14 μm to about 36 μm, and accordingly a strengthened surface of the first portion 701 may have a thickness of about 28 μm to about 72 μm out of a total thickness of about 200 μm. According to an embodiment, the thickness $D_1$ of the first portion 701 may be constant or substantially constant, and the depth of layer ($DOL_1$) of the first portion 701 may be constant or substantially constant. The average of the depth of layer ($DOL_1$) of the first portion 701 may be in a range of about 7% to about 18% of the average thickness of the first portion 701.

According to an embodiment, the depth of layer ($DOL_2$) of the second portion 702 may be in a range of about 15% to about 20% of the thickness $D_2$ of the second portion 702. For example, when the thickness $D_2$ of the second portion 702 is about 100 μm, the depth of layer ($DOL_2$) of the second portion 702 may be in a range of about 15 μm to about 20 μm, and accordingly a strengthened surface of the second portion 702 may have a thickness of about 30 μm to about 40 μm out of a total thickness of about 50 μm. According to an embodiment, the thickness $D_2$ of the second portion 702 may be constant or substantially constant, and the depth of layer ($DOL_2$) of the second portion 702 may be constant or substantially constant. The average of the depth of layer ($DOL_2$) of the second portion 702 may be in a range of about 15% to about 20% of the average thickness of the second portion 702.

According to an embodiment, the glass substrate 700 may include at least one of soda-lime glass, lead-alkali glass, borosilicate glass, aluminosilicate glass, aluminum lithium silicate glass and silica glass. However, the embodiments are not limited thereto, and all glass that may be available as the glass substrate 700 may be used. For example, the glass substrate 700 may contain an element including at least one of aluminum, lithium, boron and lead, and may be, for example, glass with a strength enhanced by adding the element.

According to an embodiment, the glass substrate 700 may be suitable for use in a display device (e.g., a display) of a portable electronic device or a cover of an electronic device.

According to an embodiment, a concentration of potassium ions ($K^+$) in the first portion 701 may decrease in a direction from the surface (e.g., the outer surface) of the first portion 701 toward the inside of the first portion 701. Referring to FIG. 7, chemical strengthening may be performed on a surface of the first portion 701 facing a +Z direction and a surface of the first portion 701 facing a −Z direction. For example, on the surface of the first portion 701 facing the +Z direction, the chemical strengthening may be performed by ion exchange in the −Z direction, and the concentration of potassium ions may decrease in the −Z direction from the surface as the ion exchange is performed. Similarly, on the surface of the first portion 701 facing the −Z direction, the concentration of potassium ions may decrease in the +Z direction from the surface.

According to an embodiment, a concentration of potassium ions (K⁺) in the second portion 702 may decrease in a direction from the surface (e.g., the outer surface) of the second portion 702 toward the inside of the second portion 702. Referring to FIG. 7, chemical strengthening may be performed on a surface of the second portion 702 facing the +Z direction and a surface of the second portion 702 facing the −Z direction. For example, on the surface of the second portion 702 facing the +Z direction, the chemical strengthening may be performed by ion exchange in the −Z direction, and the concentration of potassium ions may decrease in the −Z direction from the surface as the ion exchange is performed. Similarly, on the surface of the second portion 702 facing the −Z direction, the concentration of potassium ions may decrease in the +Z direction from the surface.

According to an embodiment, a concentration of potassium ions (K⁺) in the third portion 703 may decrease in a direction from the surface (e.g., the outer surface) of the third portion 703 toward the inside of the third portion 703. Referring to FIG. 7, chemical strengthening may be performed on a surface of the third portion 703 facing the +Z direction and a surface of the third portion 703 facing the −Z direction. For example, on the surface of the third portion 703 facing the +Z direction, the chemical strengthening may be performed by ion exchange in the −Z direction, and the concentration of potassium ions may decrease in the −Z direction from the surface as the ion exchange is performed. Similarly, on the surface of the third portion 703 facing the −Z direction, the concentration of potassium ions may decrease in the +Z direction from the surface.

According to a comparative example, when the depth of layer ($DOL_2$) of the second portion 702 is formed to be equal to the depth of layer ($DOL_1$) of the first portion 701, chemical strengthening of the second portion 702 that is thinner than the first portion 701 may be excessively performed, and warpage and wrinkling may occur due to an extremely high occupancy of the depth of layer ($DOL_2$) of the second portion 702. Accordingly, a portion or all of the glass substrate 700 may be etched through an etching process, so that the compression strength of the surface may be reduced, thereby enhancing a quality of the surface of the glass substrate 700.

According to an embodiment, a difference between an amount of expansion of the first portion 701 and an amount of expansion of the second portion 702 may be about 0.5 millimeter (mm) or less. According to an embodiment, the amount of expansion may be calculated based on a difference in a length of the glass substrate 700 in a width direction (e.g., the X direction) and/or a longitudinal direction (e.g., the Y direction) between before and after chemical strengthening is performed. For example, when a length of the first portion 701 in the width direction (e.g., the X direction) before the chemical strengthening is performed (e.g., an original length or pre-strengthening length) is 50 mm, and when the length of the first portion 701 in the width direction after the chemical strengthening is performed (e.g., strengthened length or post-strengthening length) is 51 mm, an amount of expansion of the first portion 701 in the width direction may be calculated as 1 mm.

According to an embodiment, the difference between the amount of expansion of the first portion 701 and the amount of expansion of the second portion 702 may be about 0.5 mm or less. According to an embodiment, the difference between the amount of expansion of the first portion 701 and the amount of expansion of the second portion 702 may be about 0.3 mm or less, and such as about 0.1 mm or less, or about 0.05 mm or less.

In an embodiment, a chemically strengthened thickness portion of the glass substrate (e.g., a depth of layer) is a chemically strengthened portion of a pre-strengthened glass substrate having a pre-strengthened dimension, the glass substrate having the chemically strengthened thickness portion has an expanded dimension larger than the pre-strengthened dimension, at both the first portion and the second portion, and a difference between the expanded dimension and the pre-strengthened dimension at the first portion and a difference between the expanded dimension and the pre-strengthened dimension at the second portion is about 0.5 millimeter or less.

According to an embodiment, the glass substrate 700 which is bent may define a radius of curvature of the second portion 702 of about 0.5 mm or less. According to an embodiment, the glass substrate 700 may be rolled or folded about or at the second portion 702, and a radius of curvature of the bent second portion 702 may be about 0.5 mm or less. According to an embodiment, the glass substrate 700 which is bent may define a radius of curvature of the second portion 702 of about 0.4 mm or less, about 0.3 mm or less, 0.2 mm or less, or 0.1 mm or less.

According to an embodiment, a compression strength of each of the first portion 701, the second portion 702, and the third portion 703 based on a depth of layer may satisfy Equation 1 shown below.

$$DOL \times 57.3 + 100 \leq CS \leq DOL \times 105 + 100 \qquad \text{[Equation 1]}$$

In Equation 1, DOL denotes a depth of layer, and CS denotes a compression strength.

According to an embodiment, a thickness and depth of layer (DOL) of each of the first portion 701 and the second portion 702 may be the same or substantially the same according to the position thereof. According to an embodiment, the thickness of the third portion 703 may vary depending on the position thereof, but the depth of layer ($DOL_3$) of the third portion 703 may be the same or substantially the same. According to an embodiment, the depth of layer and the compression strength based on the position of each portion may be proportional to each other, and may satisfy, for example, Equation 1.

According to an embodiment, the third portion 703 may have an inclination angle of about 1 degree to about 50 degrees with respect to an extended surface of the first portion 701. That is, an outer surface of the third portion 703 may have an inclination angle of about 1 degree to about 50 degrees with respect to an extended surface (e.g., a virtual line of an extended outer surface) of the first portion 701. According to an embodiment, the third portion 703 may be formed such that the thickness thereof gradually decreases in a direction from the first portion 701 to the second portion 702. According to an embodiment, the inclination angle of the third portion 703 may be in a range of about 1 degree to about 50 degrees with respect to an extending direction of the first portion 701. According to an embodiment, the inclination angle of the third portion 703 may be calculated based on the extension direction of the first portion 701, for example, based on an X-axis to be extended parallel to the X-axis. The inclination angle of the third portion 703 may be in the range of about 1 degree to about 50 degrees based on the X-axis.

According to an embodiment, a surface compression strength of at least one of the first portion 701, the second portion 702 and the third portion 703 may be in a range of about 500 megapascals (MPa) to about 1000 MPa. According to an embodiment, the surface compression strength of at least one of the first portion 701, the second portion 702 and the third portion 703 may be rapidly reduced by etching at least a respective portion of the glass substrate 700. In addition, an optimal condition between the compression strength and the depth of layer may be secured, and a surface quality of the glass substrate 700 may be enhanced.

According to an embodiment, the surface compression strength of at least one of the first portion 701, the second portion 702 and the third portion 703 may be about 500 MPa or greater, about 550 MPa or greater, about 600 MPa or greater, about 650 MPa or greater, about 700 MPa or greater, about 750 MPa or greater, about 800 MPa or greater, about 850 MPa or greater, about 900 MPa or greater or about 950 MPa or greater, may be about 1000 MPa or less, about 950 MPa or less, about 900 MPa or less, about 850 MPa or less, about 800 MPa or less, about 750 MPa or less, about 700 MPa or less, about 650 MPa or less, about 600 MPa or less or about 550 MPa or less, or may be in a range between two values selected from the above-described values.

According to an embodiment, a discontinuity in a concentration of potassium ions may be formed inside at least one of the first portion 701, the second portion 702 and the third portion 703, or at a boundary between adjacent portions among the first portion 701, the second portion 702 or the third portion 703. According to an embodiment, based on the +X direction and/or the −X direction of the glass substrate 700, the concentration of potassium ions may be irregular. According to an embodiment, the first portion 701, the second portion 702, and the third portion 703 may be different from each other in the thickness, and accordingly a depth by which strengthening is performed from the surface may be different, so that the discontinuity in the concentration of the potassium ions may be formed. According to an embodiment, the glass substrate 700 may be immersed in a chemical strengthening solution and at least a portion of the glass substrate 700 may be etched. Etching may be performed from the surface so that a strengthened portion of the surface may be etched. Accordingly, a discontinuity in a concentration of strengthening ions, for example, potassium ions, may be formed based on a boundary and/or a point where the etching is performed. Here, the discontinuity in the concentration of the potassium ions may refer to a point, an interval, or a surface in which the concentration of the potassium ions rapidly decreases or increases. For example, the discontinuity in the concentration of the potassium ion may be represented by a discontinuous point, a discontinuous line or a discontinuous surface of the concentration of the potassium ions. In an embodiment, the first portion, the second portion and the third portion are adjacent to each other along a direction (e.g., based on the +X direction and/or the −X direction), each of the first portion, the second portion and the third portion has a concentration of potassium ions along the direction, a change or difference (such as a largest difference) in the concentration of potassium ions defines a discontinuity in a concentration of potassium ions, and the discontinuity in a concentration of potassium ions is defined in at least one of the first portion, the second portion and the third portion, or at a respective boundary of at least one of the first portion, the second portion and the third portion.

According to an embodiment, an average thickness of a first portion (e.g., the first portion 701 of FIG. 7) may be in the range of about 50 μm to about 500 μm, and an average thickness of a second portion (e.g., the second portion 702 of FIG. 7) may be in the range of about 10 μm to about 80 μm.

According to an embodiment, the average thickness of the second portion (e.g., the second portion 702 of FIG. 7) may be less than or equal to about 90% of the average thickness of the first portion (e.g., the first portion 701 of FIG. 7).

According to an embodiment, a difference between an average of a depth of layer ($DOL_1$) of the first portion 701 and an average of a depth of layer ($DOL_2$) of the second portion 702 may be about 2 μm or less.

According to an embodiment, the average of the depth of layer of the first portion (e.g., the first portion 701 of FIG. 7) may be in a range of about 7% to about 18% of the average thickness of the first portion (e.g., the first portion 701 of FIG. 7), and the average of the depth of layer of the second portion (e.g., the second portion 702 of FIG. 7) may be in a range of about 15% to about 20% of the average thickness of the second portion (e.g., the second portion 702 of FIG. 7).

According to an embodiment, a glass substrate (e.g., the glass substrate 700 of FIG. 7) may include at least one of soda-lime glass, lead-alkali glass, borosilicate glass, aluminosilicate glass, aluminum lithium silicate glass and silica glass.

According to an embodiment, a concentration of potassium ions in the first portion (e.g., the first portion 701 of FIG. 7) may decrease in a direction from a surface of the first portion (e.g., the first portion 701 of FIG. 7) toward the inside of the first portion. A concentration of potassium ions in the second portion (e.g., the second portion 702 of FIG. 7) may decrease in a direction from a surface of the second portion (e.g., the second portion 702 of FIG. 7) toward the inside of the second portion.

According to an embodiment, a difference between an amount of expansion of the first portion (e.g., the first portion 701 of FIG. 7) and an amount of expansion of the second portion (e.g., the second portion 702 of FIG. 7) may be about 0.5 mm or less.

According to an embodiment, a radius of curvature of the second portion (e.g., the second portion 702 of FIG. 7) may be about 0.5 mm or less in the glass substrate 700 which is bent.

According to an embodiment, a compression strength of each of the first portion (e.g., the first portion 701 of FIG. 7), the second portion (e.g., the second portion 702 of FIG. 7), and the third portion (e.g., the third portion 703 of FIG. 7) based on a depth of layer may satisfy Equation 1 shown below.

$$DOL \times 57.3 + 100 \leq CS \leq DOL \times 105 + 100 \qquad \text{[Equation 1]}$$

In Equation 1, DOL denotes a depth of layer, and CS denotes a compression strength.

According to an embodiment, the third portion (e.g., the third portion 703 of FIG. 7) may have an inclination angle of about 1 degree to about 50 degrees with respect to an extended surface of the first portion (e.g., the first portion 701 of FIG. 7).

According to an embodiment, a surface compression strength of at least one of the first portion (e.g., the first portion 701 of FIG. 7), the second portion (e.g., the second portion 702 of FIG. 7) and the third portion (e.g., the third portion 703 of FIG. 7) may be in a range of about 500 MPa to about 1000 MPa.

According to an embodiment, a discontinuity in a concentration of potassium ions may be formed inside at least one of the first portion (e.g., the first portion 701 of FIG. 7), the second portion (e.g., the second portion 702 of FIG. 7) and the third portion (e.g., the third portion 703 of FIG. 7), or at a boundary of at least one of the first portion (e.g., the first portion 701 of FIG. 7), the second portion (e.g., the second portion 702 of FIG. 7) and the third portion (e.g., the third portion 703 of FIG. 7).

A display device for a flexible display according to an embodiment may include a display module (e.g., the display module 160 of FIG. 1, the display 250 of FIG. 2, and the flexible display 530 of FIG. 5) including a folding area (e.g., the folding area 253 of FIG. 2) and a non-folding area (e.g., the first area 251 and the second area 252 of FIG. 2) adjacent to the folding area, and a glass substrate arranged on the display module. The glass substrate may face the display module (or flexible display) at each of the folding area and the non-folding area, along a thickness direction, without being limited thereto.

According to an embodiment, the glass substrate included in the display device may be the aforementioned glass substrate. For example, the glass substrate may include a first portion (e.g., the first portion 701 of FIG. 7), a second portion (e.g., the second portion 702 of FIG. 7), and a third portion (e.g., the third portion 703 of FIG. 7) connecting the first portion and the second portion to each other. An average thickness of the first portion (e.g., the first portion 701 of FIG. 7) may be greater than an average thickness of the second portion (e.g., the second portion 702 of FIG. 7), and an average of a depth of layer of the first portion (e.g., the first portion 701 of FIG. 7) may be about 0.75 to about 1.3 times an average of a depth of layer of the second portion (e.g., the second portion 702 of FIG. 7).

According to an embodiment, the first portion (e.g., the first portion 701 of FIG. 7) of the glass substrate (e.g., the glass substrate 700 of FIG. 7) may correspond to the non-folding area (e.g., the first area 251 and the second area 252 of FIG. 2), and the second portion (e.g., the second portion 702 of FIG. 7) may correspond to the folding area (e.g., the folding area 253 of FIG. 2). That is, the glass substrate 700 may disposed facing the non-folding area and the folding area of the display module. The glass substrate 700 may disposed at a viewing side of the display module, to function as a cover of an electronic device. In various embodiments, the glass substrate 700 may be a base substrate within a display module on which layers (e.g., insulating, display element layer, circuit layer, etc.) are formed, a support member located under the display module at a rear side which is opposite to the viewing side, etc.

An entirety of the third portion (e.g., the third portion 703 of FIG. 7) of the glass substrate may be disposed corresponding to the non-folding area correspond to the non-folding area (e.g., the first area 251 and the second area 252 of FIG. 2) or the folding area (e.g., the folding area 253 of FIG. 2). In an embodiment, the third portion (e.g., the third portion 703 of FIG. 7) of the glass substrate may be disposed corresponding to both the non-folding area correspond to the non-folding area (e.g., the first area 251 and the second area 252 of FIG. 2) or the folding area (e.g., the folding area 253 of FIG. 2). That is, the third portion (e.g., the third portion 703 of FIG. 7) of the glass substrate may define a transition portion at which a thickness of the first portion transitions to a thickness of the second portion.

Referring again to FIGS. 2, 4A and 4B, together with FIG. 7, the first portion (e.g., the first portion 701 of FIG. 7) of the glass substrate (e.g., the glass substrate 700 of FIG. 7) may be disposed at opposing sides of the display 250 to define a plurality of first portions of the glass substrate, along the X-axis direction, with the second portion (e.g., the second portion 702 of FIG. 7) therebetween. The third portion (e.g., the third portion 703 of FIG. 7) of the glass substrate may be between the second portion, and each of the plurality of first portions respectively, to define a plurality of third portions of the glass substrate which are spaced apart from each other at the folding area by the second portion.

Referring to FIGS. 5A, 5B, 6A and 6B, together with FIG. 7, the first portion (e.g., the first portion 701 of FIG. 7) of the glass substrate (e.g., the glass substrate 700 of FIG. 7) may correspond to the flat portion of the flexible display (e.g., the flexible display 530 of FIGS. 5A, 5B, 6A and 6B) supported by the second housing (e.g., the second housing 520 of FIGS. 5A, 5B, 6A and 6B), and/or an end portion of the flexible display (e.g., end portion of the flexible display 530 of FIGS. 5A, 5B, 6A and 6B which is furthest in the –X-axis direction). The second portion (e.g., the second portion 702 of FIG. 7) may correspond to the bendable portion extending from the flat portion and supported by the first housing (e.g., the bendable portion of flexible display 530 which is supported by first housing 510 of FIGS. 5A, 5B, 6A and 6B).

Referring again to FIGS. 5A, 5B, 6A and 6B, together with FIG. 7, the first portion (e.g., the first portion 701 of FIG. 7) of the glass substrate (e.g., the glass substrate 700 of FIG. 7) may correspond to the flat portion of the flexible display (e.g., the flexible display 530 of FIGS. 5A, 5B, 6A and 6B) supported by the second housing (e.g., the second housing 520 of FIGS. 5A, 5B, 6A and 6B), and the second portion (e.g., the second portion 702 of FIG. 7) may correspond to the bendable portion extending from the flat portion and supported by the first housing (e.g., the bendable portion of flexible display 530 which is supported by first housing 510 of FIGS. 5A, 5B, 6A and 6B) and an end portion of the flexible display (e.g., end portion of the flexible display 530 of FIGS. 5A, 5B, 6A and 6B which is furthest in the –X axis direction).

Referring again to FIGS. 5A, 5B, 6A and 6B, together with FIG. 7, in the various embodiments discussed above, the third portion (e.g., the third portion 703 of FIG. 7) of the glass substrate may be respectively between the first portion and the second portion which variously correspond to the flat portion, the bendable portion and the end portion of the flexible display.

The display device may further include a transparent resin material used to fill a space between the glass substrate (e.g., the glass substrate 700 of FIG. 7) and the display module (e.g., the display module 160 of FIG. 1, the display 250 of FIG. 2, and the flexible display 530 of FIG. 5). According to an embodiment, the transparent resin material may include at least one of an acrylic compound, an epoxy compound, silicone, a urethane compound, a urethane composite, a urethane acrylic compound, a hybrid sol-gel and a siloxane compound. According to an embodiment, the transparent resin material may include a composition having the same or substantially the same refractive index as that of the glass substrate (e.g., the glass substrate 700 of FIG. 7), and may be applied for adhesion of the glass substrate (e.g., the glass substrate 700 of FIG. 7) and the display module (e.g., the display module 160 of FIG. 1, the display 250 of FIG. 2, and the flexible display 530 of FIG. 5). According to an embodiment, the transparent resin material may supplement a strength and elasticity of the glass substrate (e.g., the glass substrate 700 of FIG. 7).

According to an embodiment, the first portion (e.g., the first portion 701 of FIG. 7) may correspond to the non-folding area (e.g., the first area 251 and the second area 252 of FIG. 2), and the second portion (e.g., the second portion 702 of FIG. 7) may correspond to the folding area (e.g., a folding portion of the folding area 253 of FIG. 2).

The display device may further include a transparent resin material used to fill a space between the glass substrate (e.g., the glass substrate 700 of FIG. 7) and the display module (e.g., the display module 160 of FIG. 1, the display 250 of FIG. 2, and the flexible display 530 of FIG. 5).

According to an embodiment, the transparent resin material may include at least one of an acrylic compound, an epoxy compound, silicone, a urethane compound, a urethane composite, a urethane acrylic compound, a hybrid sol-gel and a siloxane compound.

An electronic device (e.g., the electronic device 200 of FIG. 2) according to an embodiment may include a flexible display. Specifically, the electronic device may include a first housing (e.g., the first housing structure 210 of FIG. 2), a second housing (e.g., the second housing structure 220 of FIG. 2), a folding hinge portion (e.g., the hinge structure 230 of FIG. 2) coupled between the first housing (e.g., the first housing structure 210 of FIG. 2) and the second housing (e.g., the second housing structure 220 of FIG. 2) to connect the first housing (e.g., the first housing structure 210 of FIG. 2) and the second housing (e.g., the second housing structure 220 of FIG. 2) to each other, so that the first housing (e.g., the first housing structure 210 of FIG. 2) and the second housing (e.g., the second housing structure 220 of FIG. 2) are foldable, a display module positioned in the first housing (e.g., the first housing structure 210 of FIG. 2) and the second housing (e.g., the second housing structure 220 of FIG. 2), and the flexible display (e.g., the glass substrate 700 of FIG. 7) arranged on the display module.

According to an embodiment, the electronic device (e.g., the electronic device 200 of FIG. 2) may be folded or unfolded according to rotation of the first housing (e.g., the first housing structure 210 of FIG. 2) and the second housing (e.g., the second housing structure 220 of FIG. 2) about the folding hinge portion (e.g., the hinge structure 230 of FIG. 2). As described above, based on a position relationship between the first housing (e.g., the first housing structure 210 of FIG. 2) and the second housing (e.g., the second housing structure 220 of FIG. 2), a fully folded state, a fully unfolded state, or an unfolded or folded state and an intermediate state that is a partially unfolded or partially folded state between the fully folded state and the fully unfolded state may be achieved, and accordingly the flexible display coupled to the first housing and the second housing may also be folded or unfolded to correspond to the above state.

According to an embodiment, the flexible display may include a first portion (e.g., the first portion 701 of FIG. 7), a second portion (e.g., the second portion 702 of FIG. 7), and a third portion (e.g., the third portion 703 of FIG. 7) interposed between the first portion (e.g., the first portion 701 of FIG. 7) and the second portion (e.g., the second portion 702 of FIG. 7) to connect the first portion (e.g., the first portion 701 of FIG. 7) and the second portion (e.g., the second portion 702 of FIG. 7) to each other. According to an embodiment, a thickness $D_1$ of the first portion (e.g., the first portion 701 of FIG. 7) may be greater than a thickness $D_2$ of the second portion (e.g., the second portion 702 of FIG. 7). According to an embodiment, the thickness of each of the first portion (e.g., the first portion 701 of FIG. 7) and the second portion (e.g., the second portion 702 of FIG. 7) may be constant or substantially constant. According to an embodiment, the average thickness of the first portion (e.g., the first portion 701 of FIG. 7) may be greater than the average thickness of the second portion (e.g., the second portion 702 of FIG. 7). According to an embodiment, the depth of layer ($DOL_1$) of the first portion (e.g., the first portion 701 of FIG. 7) may be about 0.75 times to about 1.3 times the depth of layer ($DOL_2$) of the second portion (e.g., the second portion 702 of FIG. 7). According to an embodiment, the average of the depth of layer ($DOL_1$) of the first portion (e.g., the first portion 701 of FIG. 7) may be about 0.75 times to about 1.3 times the average of the depth of layer ($DOL_2$) of the second portion (e.g., the second portion 702 of FIG. 7).

According to an embodiment, the first housing (e.g., the first housing structure 210 of FIG. 2) and the second housing (e.g., the second housing structure 220 of FIG. 2) may be folded or unfolded about the folding hinge portion (e.g., the hinge structure 230 of FIG. 2). The flexible display (e.g., the glass substrate 700 of FIG. 7) may be folded or unfolded according to a movement of the first housing (e.g., the first housing structure 210 of FIG. 2) and the second housing (e.g., the second housing structure 220 of FIG. 2).

According to an embodiment, one of the first housing (e.g., the first housing structure 210 of FIG. 2) and the second housing (e.g., the second housing structure 220 of FIG. 2) may have a cylindrical shape so that the flexible display (e.g., the glass substrate 700 of FIG. 7) may be stored in a rolled state.

Figure 8:
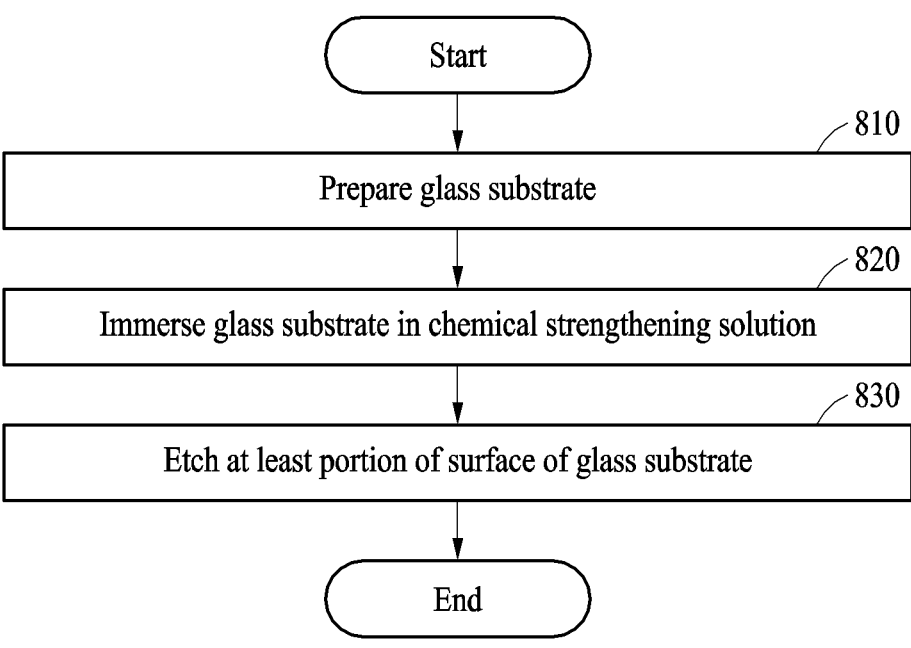
FIG. 8 is a flowchart illustrating a method of manufacturing (or providing) a glass substrate for a flexible display according to an embodiment.

FIG. 8 is a flowchart illustrating a method of manufacturing a glass substrate for a flexible display according to an embodiment.

The method of manufacturing the glass substrate for the flexible display according to an embodiment may include operation 810 of preparing a glass substrate (e.g., the glass substrate 700 of FIG. 7) including a first portion (e.g., the first portion 701 of FIG. 7) and a second portion (e.g., the second portion 702 of FIG. 7) that has a thickness less than that of the first portion (e.g., the first portion 701 of FIG. 7), operation 820 of immersing the glass substrate (e.g., the glass substrate 700 of FIG. 7) in a chemical strengthening solution, and operation 830 of etching at least a portion of a surface of the glass substrate (e.g., the glass substrate 700 of FIG. 7).

According to an embodiment, the prepared glass substrate may include a third portion (e.g., the third portion 703 of FIG. 7) between the first portion (e.g., the first portion 701 of FIG. 7) and the second portion (e.g., the second portion 702 of FIG. 7) to connect the first portion and the second portion to each other. According to an embodiment, the third portion (e.g., the third portion 703 of FIG. 7) may have a thickness between the thickness of the first portion (e.g., the first portion 701 of FIG. 7) and the thickness of the second portion (e.g., the second portion 702 of FIG. 7), and the thickness of the third portion may vary depending on a position of the third portion.

According to an embodiment, the chemical strengthening solution may include a strengthening salt. According to an embodiment, the glass substrate (e.g., the glass substrate 700 of FIG. 7) may be immersed in the chemical strengthening solution so that chemical strengthening may be performed inwardly from the surface of the glass substrate. For example, the chemical strengthening solution may include potassium nitrate, sodium nitrate, or both. According to an embodiment, the strengthening salt may include potassium nitrate, sodium nitrate, or both. According to an embodiment, the chemical strengthening solution in which the chemical strengthening is performed may be at a temperature of 350° C. to 450° C.

According to an embodiment, operation 820 may include performing chemical strengthening according to an exchange of alkali ions on the surface of the glass substrate (e.g., the glass substrate 700 of FIG. 7). According to one embodiment, the glass substrate (e.g., the glass substrate 700 of FIG. 7) may be immersed in a chemical strengthening solution containing replacement ions, so that the chemical strengthening may be performed. Here, alkali ions contained in the glass substrate (e.g., the glass substrate 700 of FIG. 7) may be replaced with alkali ions contained in the chemical strengthening solution. In an example, $Li^+$ ions in the glass substrate may be primarily replaced with $Na^+$ ions in the chemical strengthening solution, and the $Na^+$ ions may be secondarily replaced with $K^+$ ions, so that double chemical strengthening may be performed. In another example, $Na^+$ ions in the glass substrate may be replaced with $K^+$ ions in the chemical strengthening solution, so that stress may be generated inside the glass substrate through single chemical strengthening.

According to an embodiment, operation 830 may be performed by immersing the glass substrate (e.g., the glass substrate 700 of FIG. 7) in an etching solution including at least one of ammonium fluoride, sulfuric acid and hydrofluoric acid. According to an embodiment, a compression strength concentrated on the surface of the glass substrate may be reduced by etching the glass substrate (e.g., the glass substrate 700 of FIG. 7) through operation 830. In addition, through operation 830, the surface may have a relatively low compression strength in comparison to a glass substrate on which only a chemical strengthening process is performed, thereby preventing or reducing warpage or bending deformation of the glass substrate (e.g., the glass substrate 700 of FIG. 7), in particular, a second portion (e.g., the second portion 702 of FIG. 7) that is relatively thin.

According to an embodiment, operation 830 may be performed by immersing the glass substrate (e.g., the glass substrate 700 of FIG. 7) in an etching solution. Operation 830 may include adjusting an etch rate of the glass substrate (e.g., the glass substrate 700 of FIG. 7) by adjusting an immersion speed of the glass substrate (e.g., the glass substrate 700 of FIG. 7). According to an embodiment, operation 830 may include performing first etching by immersing the first portion (e.g., the first portion 701 of FIG. 7) or the second portion (e.g., the second portion 702 of FIG. 7) in an etching solution, and performing second etching by immersing the remaining portion of the glass substrate (e.g., the glass substrate 700 of FIG. 7) in the etching solution.

According to an embodiment, an immersion process may be performed by performing chemical strengthening according to an exchange of alkali ions on a surface of a glass substrate.

According to an embodiment, an etching process may be performed by immersing a glass substrate in an etching solution including at least one of ammonium fluoride, sulfuric acid and hydrofluoric acid.

According to an embodiment, the etching process may be performed by immersing the glass substrate in the etching solution. The etching process may include adjusting an etch rate of the glass substrate by adjusting an immersion speed of the glass substrate.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components.

It is to be understood that a singular form of a noun corresponding to an item may include one or more of the things, unless the relevant context clearly indicates otherwise. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof.

Terms such as "$1^{st}$", "$2^{nd}$", or "first" or "second" may simply be used to distinguish the component from other components in question, and do not limit the components in other aspects (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element. In contrast, if an element (e.g., a first element) is referred to as being related to another element such as being "directly coupled with," "directly coupled to," "directly connected with," or "directly connected to," it means that no third element is present.

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to embodiments, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A glass substrate comprising:
a first portion which corresponds to a flat portion of a flexible display;
a second portion which is adjacent to the first portion and corresponds to a bendable portion of the flexible display which extends from the flat portion;
a third portion connecting the first portion and the second portion to each other;
a chemically strengthened thickness portion of the glass substrate extended from an outer surface of the glass substrate, at each of the first portion, the second portion and the third portion, which defines a depth of layer; wherein
each of the first portion, the second portion and the third portion of the glass substrate has an average thickness;
each of the first portion, the second portion and the third portion of the glass substrate has an average depth of layer, the average thickness of the glass substrate at the first portion is greater than the average thickness of the glass substrate at the second portion,
the average depth of the depth of layer at the first portion is in a range of about 7% to about 18% of the average thickness of the glass substrate at the first portion,
the average depth of the depth of layer of at the second portion is in a range of about 15% to about 20% of the average thickness of the glass substrate at the second portion, and
a radius of curvature at the second portion of the glass substrate is about 0.4 millimeter or less.

2. The glass substrate of claim 1, wherein
the average thickness of the glass substrate at the first portion is in a range of about 50 micrometers to about 500 micrometers, and
the average thickness of the glass substrate at the second portion is in a range of about 10 micrometers to about 80 micrometers.

3. The glass substrate of claim 1, wherein the average thickness of the glass substrate at the second portion is less than or equal to about 90% of the average thickness of the glass substrate at the first portion.

4. The glass substrate of claim 1, wherein a difference between the average depth of the depth of layer at the first portion and the average depth of the depth of layer at the second portion is about 2 micrometers or less.

5. The glass substrate of claim 1, wherein the average depth of the depth of layer at the first portion is about 0.75 to about 1.3 times the average depth of the depth of layer at the second portion.

6. The glass substrate of claim 1, wherein the glass substrate comprises at least one selected from soda-lime glass, lead-alkali glass, borosilicate glass, aluminosilicate glass, aluminum lithium silicate glass, and silica glass.

7. The glass substrate of claim 1, wherein within the depth of layer:
a concentration of potassium ions at the first portion decreases in a direction from the outer surface toward an inside of the glass substrate, and
a concentration of potassium ions at the second portion decreases in the direction from the outer surface and toward the inside of the glass substrate.

8. The glass substrate of claim 1, wherein
the chemically strengthened thickness portion of the glass substrate is a chemically strengthened portion of a pre-strengthened glass substrate having a pre-strengthened dimension,
the glass substrate having the chemically strengthened thickness portion has an expanded dimension larger than the pre-strengthened dimension, at both the first portion and the second portion, and
a difference between the expanded dimension and the pre-strengthened dimension at the first portion and a difference between the expanded dimension and the pre-strengthened dimension at the second portion are about 0.5 millimeter or less.

9. The glass substrate of claim 1, wherein
the glass substrate is bendable at the second portion, together with bending of the flexible display at the bendable portion.

10. The glass substrate of claim 1, wherein a compression strength of each of the first portion, the second portion, and the third portion, based on the depth of layer satisfies the following equation:

$$DOL \times 57.3 + 100 \leq CS \leq DOL \times 105 + 100$$

wherein DOL denotes a depth in microns of the depth of layer, and CS denotes a compression strength in megapascals.

11. The glass substrate of claim 1, wherein
the outer surface of the glass substrate at the third portion is inclined at about 1 degree to about 50 degrees with respect to the outer surface of the glass substrate at the first portion.

12. The glass substrate of claim 1, wherein a surface compression strength of at least one of the first portion, the second portion and the third portion is in a range of about 500 megapascals to about 1000 megapascals.

13. The glass substrate of claim 1, wherein
the first portion, the second portion and the third portion are adjacent to each other along a first direction,
each of the first portion, the second portion and the third portion has a concentration of potassium ions along the first direction,
a change in the concentration of potassium ions defines a discontinuity in a concentration of potassium ions, and
the discontinuity in a concentration of potassium ions is defined in at least one of the first portion, the second portion and the third portion, or at a respective boundary of at least one of the first portion, the second portion and the third portion.

\* \* \* \* \*